(12) United States Patent (10) Patent No.: US 8,775,662 B2
Yang et al. (45) Date of Patent: Jul. 8, 2014

(54) SYSTEM AND METHOD FOR PROGRESSIVE DELIVERY OF MULTIMEDIA OBJECTS

(75) Inventors: En-Hui Yang, Waterloo (CA); Ajit Singh, Waterloo (CA); Brian Lamb, Kitchener (CA); Longji Wang, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 854 days.

(21) Appl. No.: 11/535,765

(22) Filed: Sep. 27, 2006

(65) Prior Publication Data

US 2007/0294333 A1 Dec. 20, 2007

Related U.S. Application Data

(60) Provisional application No. 60/720,487, filed on Sep. 27, 2005.

(51) Int. Cl.
*G06F 15/16* (2006.01)

(52) U.S. Cl.
USPC ............................ 709/232; 709/213; 370/235

(58) Field of Classification Search
USPC ........................................................ 709/232
See application file for complete search history.

(56) References Cited

U.S. PATENT DOCUMENTS

| | | | | |
|---|---|---|---|---|
| 4,222,076 | A * | 9/1980 | Knowlton | 358/470 |
| 5,315,670 | A | 5/1994 | Shapiro | |
| 5,577,134 | A * | 11/1996 | Westerink | 382/240 |
| 5,886,733 | A * | 3/1999 | Zdepski et al. | 725/64 |
| 6,314,452 | B1 * | 11/2001 | Dekel et al. | 709/203 |
| 6,339,785 | B1 * | 1/2002 | Feigenbaum | 709/213 |
| 6,684,088 | B1 | 1/2004 | Halahmi | |
| 6,801,947 | B1 | 10/2004 | Li | |
| 6,925,208 | B1 * | 8/2005 | Huffman | 382/232 |
| 7,436,771 | B2 * | 10/2008 | Roberts et al. | 370/235 |
| 7,437,428 | B1 * | 10/2008 | Muti et al. | 709/219 |
| 7,721,204 | B2 * | 5/2010 | Eschbach et al. | 715/273 |
| 2002/0051583 | A1 * | 5/2002 | Brown et al. | 382/299 |

(Continued)

OTHER PUBLICATIONS

Supplementary European Search Report, Application No. 06790752.7, mailed Dec. 4, 2008.

(Continued)

*Primary Examiner* — Hamza Algibhah
(74) *Attorney, Agent, or Firm* — Bereskin & Parr LLP/S.E.N.C.R., s.r.l.

(57) ABSTRACT

The present disclosure relates to methods and systems for progressively delivering multimedia content over a network. According to one aspect, a system for delivering multimedia content through a network includes a server side sub-system and a client side sub-system. The server side sub-system is configured to: concurrently send a first predetermined portion of each of the plurality of objects through the network, wherein the first predetermined portion is less than a complete object for at least one of the plurality of objects; and after sending the first predetermined portion of each of the plurality of objects, successively send subsequent predetermined portions of each of the plurality of objects until all portions of the plurality of objects have been sent. The client side sub-system is configured to: receive the first predetermined portion of each of the plurality of objects through the network; and after receiving the first predetermined portion of each of the plurality of objects, successively receive subsequent predetermined portions of each of the plurality of objects until all portions of each of the plurality of objects have been received.

36 Claims, 11 Drawing Sheets

(56) References Cited

U.S. PATENT DOCUMENTS

| | | | |
|---|---|---|---|
| 2002/0107935 | A1 | 8/2002 | Lowery et al. |
| 2002/0110149 | A1* | 8/2002 | Roberts et al. ............... 370/477 |
| 2003/0120680 | A1* | 6/2003 | Agrawal et al. .......... 707/103 R |
| 2004/0010613 | A1* | 1/2004 | Apostolopoulos et al. ... 709/231 |
| 2004/0179744 | A1* | 9/2004 | Chang et al. .................. 382/240 |
| 2004/0184665 | A1* | 9/2004 | Guillou et al. ............... 382/232 |
| 2004/0205165 | A1 | 10/2004 | Melamed et al. |
| 2005/0055644 | A1* | 3/2005 | Stockton ...................... 715/766 |
| 2005/0091397 | A1* | 4/2005 | Roberts et al. ............... 709/232 |
| 2005/0097445 | A1* | 5/2005 | Day et al. ................... 715/501.1 |
| 2005/0114380 | A1* | 5/2005 | Eldar et al. ................... 707/102 |
| 2005/0201624 | A1 | 9/2005 | Hara et al. |
| 2005/0271283 | A1* | 12/2005 | Dekel et al. .................. 382/232 |
| 2006/0004908 | A1* | 1/2006 | Saitou et al. ................. 709/201 |
| 2006/0104545 | A1* | 5/2006 | Matsumoto .................. 382/302 |
| 2007/0071339 | A1 | 3/2007 | Yang et al. |
| 2007/0076968 | A1 | 4/2007 | Yang et al. |
| 2007/0294333 | A1 | 12/2007 | Yang et al. |

OTHER PUBLICATIONS

Patent Cooperation Treaty—International Searching Authority, PCT/CA2006/001588 Written Opinion of the International Searching Authority, Feb. 2, 2007, WIPO.

Patent Cooperation Treaty—International Searching Authority, PCT/CA2006/001588 International Search Report, Feb. 2, 2007, WIPO.

A. Said and W.A. Pearlman, "A New Fast and Efficient Image Codec Based on Set Partitioning in Hierarchical Trees," IEEE Transactions on Circuits and Systems for Video Technology, vol. 6, pp. 243-250, Jun. 1996.

X. Chen, S. Kwong, and J. Feng, "A new compression scheme for color-quantized images," IEEE Transactions on Circuits and System for Video Technology, vol. 12, No. 10, pp. 904-908, Oct. 2002.

First Examination Report for related Indian application No. 1238/CHENP/2008, dated Sep. 27, 2012.

Response dated Nov. 25, 2011, European Patent Application No. 06790752.7.

Examination Report dated Jul. 28, 2011, European Patent Application No. 06790752.7.

Voluntary Amendment dated May 20, 2011, European Patent Application No. 06790752.7.

Response to Examination Report dated Jan. 15, 2010, European Patent Application No. 06790752.7.

Examination Report dated Jul. 20, 2009, European Patent Application No. 06790752.7.

Response to EESR dated May 21, 2009, European Patent Application No. 06790752.7.

Examination Report dated May 19, 2009, European Patent Application No. 06790752.7.

European Patent Application No. 1 929 737 dated Jun. 11, 2008, European Patent Application No. 06790752.7.

Canadian Patent Application No. 2,620,929, Publication dated Apr. 5, 2007.

First Office Action dated Mar. 3, 2011, Canadian Patent Application No. 2,620,929.

Response dated Aug. 24, 2011, Canadian Patent Application No. 2,620,929.

Voluntary Amendment dated Sep. 14, 2011, Canadian Patent Application No. 2,620,929.

Second Office Action dated Jun. 15, 2012, Canadian Patent Application No. 2,620,929.

Response to Second Office Action dated Nov. 13, 2012, Canadian Patent Application No. 2,620,929.

Chinese Publication No. CN10127364A dated Sep. 24, 2008, Chinese Patent Application No. 200680035540.7.

First Office Action dated Aug. 12, 2010, Chinese Patent Application No. 200680035540.7.

PCT Publication No. WO2007/036032 A1 dated Apr. 5, 2007, in relation to Patent Application No. PCT/CA2006/001588.

Second Office Action dated Mar. 10, 2011, Chinese Patent Application No. 200680035540.7.

PCT Patent Application No. PCT/CA2006/001588, International Preliminary Report on Patentability dated Apr. 10, 2008.

Notification of Completion of Formalities for Registration (in Chinese and English translation) dated Jul. 14, 2011, Chinese Patent Application No. 200680035540.7.

Notification of Grant of Invention Patent (in Chinese and English translation) dated Jul. 14, 2011, Chinese Patent Application No. 200680035540.7.

Certificate of Invention Patent dated Nov. 9, 2011, Chinese Patent Application No. 200680035540.7.

Issued Chinese Patent No. 101273604B dated Nov. 9, 2011, Chinese Patent Application No. 200680035540.7.

Response as filed in relation to Indian Patent Application 1238/CHENP/2008, dated Jul. 18, 2013.

Second Office Action in relation to Indian Patent Application No. 1238/CHENP/2008, dated Aug. 26, 2013.

Response to First Office Action (in Chinese and English translation) dated Dec. 16, 2010, Chinese Patent Application No. 200680035540.7.

Response to Second Office Action (in Chinese and English translation) dated May 24, 2011, Chinese Patent Application No. 200680035540.7.

Chee, Y.-Kheong, "Survey of progressive Image Transmission Methods", International Journal of Imaging Systems and Technology, vol. 10, Issue 1, Jan. 6, 1999, pp. 3-19.

Third Office Action for CA2620929 dated Dec. 27, 2013.

Response to Second Office Action dated Sep. 20, 2013, Indian Patent Application No. 1238/CHENP/2008.

* cited by examiner

SYSTEM AND METHOD FOR PROGRESSIVE DELIVERY OF MULTIMEDIA OBJECTS

PRIORITY CLAIM

This application claims the priority of U.S. Provisional Application No. 60/720,487 filed on Sep. 27, 2005, the entire content of which is hereby incorporated herein by reference.

TECHNICAL FIELD

The application relates to delivering multimedia content over a network, and in particular, to methods and systems for delivering multimedia content progressively.

BACKGROUND

Network communication, such as web access, enables millions of users around the world to download multimedia content, including web pages containing text, images, video, and sound data and programs.

However, fast and efficient delivery of multimedia content is becoming an increasingly difficult task as the number of web pages and the size of web pages continue to increase. Additionally, International connections having low bandwidth can also lead to slow content delivery, which may cause frustration to users, particularly on channels such as dial-up or cellular wireless networks. Efforts have been made to accelerate web access and/or give the perception of acceleration in order to improve the satisfaction of the end user. For example, some conventional methods related to web acceleration or user satisfaction improvement include the following:

One conventional method proposes to enhance the operation of a web browser by reducing the waiting time perceptually through the display of some cached information. Specifically, when the user clicks on a link, the link is activated by the browser to request downloading of hypertext documents from a remote server to the browser. While the user waits for a reply and/or as the hypertext documents are being downloaded, the browser displays previously cached information such as advertisements, messages, fill-in forms, notices from the service provider, or some third party. This approach has the drawback that, when first downloading a page, there may be no or very little information in the cache. Further, the user may not be interested in this information since it does not necessarily relate to the page requested.

Another known system involves a system for improving the delivery of web content by grouping and reordering the content in a content stream based upon user content preference. Since web content designers usually order the content components according to a logical display order rather than an effective delivery order, grouping and reordering components within a content stream based upon user content preference and the known capabilities of the requesting computer can improve content delivery to a certain degree. For example, a user of a requesting computer that is not equipped to play audio content can filter out the audio content from the content requests. In this situation, parts of a web page can be removed to provide greater speed, however this means that the user misses a part of the information on the web page.

A further known system describes an acceleration device positioned inbetween the web server and the remote client on the computer network. The acceleration device typically accelerates the web resource transmission by filtering at least a portion of the non-renderable data (e.g., comments, whitespace, hard returns, meta tags) from the web page source data and/or by creating a smaller version (e.g., compression and/or lower resolution) of the image data and sending the smaller version to the remote client. This method is basically directed at compressing the overall HTML data that governs the structure of the information on a web page.

When delivering multimedia content objects such as images, the size of the objects may consume large amounts of bandwidth, even when compressed. Compressing multimedia objects to a smaller version also has a limit. If the compression ratio is high, a reconstructed image may be of unacceptable quality for the end user. As such, adding further compression to what may be an already compressed object file further affects the quality. On the other hand, an image having acceptable quality may be large and may take a long time to download. Since the complete image is generally delivered to a client before being decoded and displayed, an end user may have to wait a long time before viewing the images.

Further, it may not be possible to filter some objects, such as, images, based on content preferences. For example, if there is only limited information available for an image, it would be difficult to filter to allow loading of only those images that a user wants to see.

Therefore, there is a need to improve the delivery of multimedia content over networks. In particular, there is a need to improve the delivery speed or perceived delivery speed of multimedia content, including images. There is also a need for a method to allow a user to selectively view multimedia content received through a network.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment and in which.

DETAILED DESCRIPTION

Figure 1:
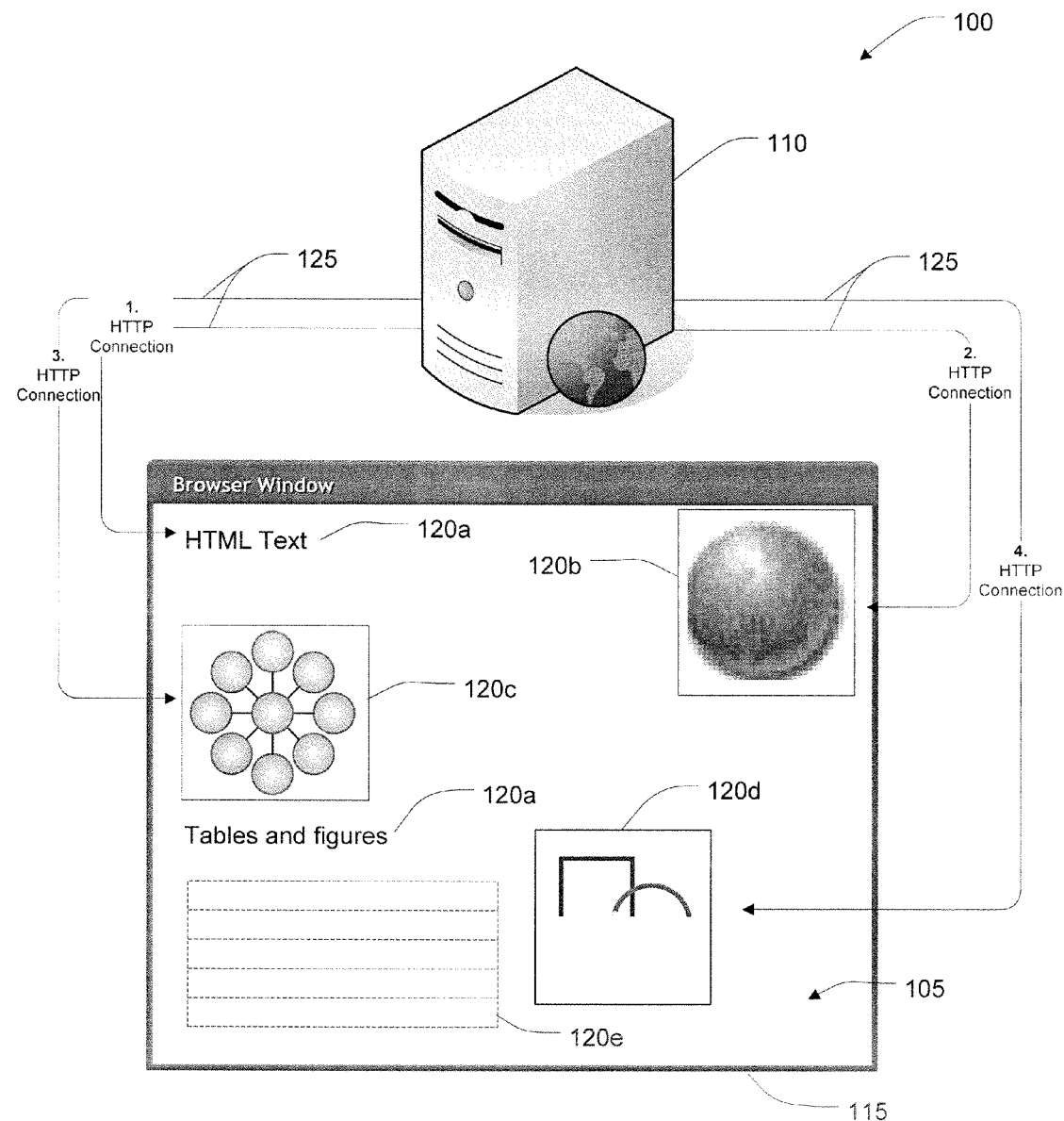
FIG. 1 is a schematic diagram showing a prior art method of delivering a web page over a network.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The present application relates to a system and method of progressively delivering multimedia content. Generally speaking, the system and method includes: re-encoding multimedia at, for example, an intermediate server into a progressive format (where appropriate); transmitting the progressive multimedia content to a client using a progressive delivery mechanism; and progressively displaying the received multimedia content at the client side. Multimedia content may be displayed at the client side using, for example, a web browser plug-in. The method is intended to improve the delivery speed or perceived delivery speed of multimedia content by quickly providing a representation of all of the objects in the multimedia content and then progressively improving or adding to all of the objects while the multimedia content is being viewed. Even though the following description focuses on progressive delivery of images, and particularly those in a JPEG and/or GIF/PNG format, on a web page, the teachings herein are also applicable to other multimedia content, including text, images, video, sound data, and programs, in a general client-server environment.

According to a first aspect, there is provided a method for sending multimedia content in a client-server system in a network, wherein the multimedia content includes a plurality of objects, the method including: concurrently sending a first predetermined portion of each of the plurality of objects from the server through the network, wherein the first predetermined portion is less than a complete object for at least one of the plurality of objects; and after sending the first predetermined portion of each of the plurality of objects, successively sending subsequent predetermined portions of each of the plurality of objects until all portions of the plurality of objects have been sent.

In a particular case, the method may further include receiving information related to the sending of objects and the sending of the first predetermined portions and subsequent predetermined portions is based on the received information. In this case, the information related to the sending of objects may include information related to objects for which sending is to be advanced, delayed or prevented, or information related to the ordering in which objects are to be sent, or the like.

In another particular case, the sending of subsequent predetermined portions may be performed only after receipt of a request for subsequent predetermined portions.

In yet another particular case, the method may further include: prior to sending, determining if any of the plurality of objects is appropriate for division into predetermined portions; and dividing each appropriate one of the plurality of objects into predetermined portions prior to sending. Further, the method may further include compressing at least one of the plurality of objects that is not appropriate for division prior to sending.

In yet another particular case, the method may further include holding the subsequent predetermined portions pending receipt of a request for the subsequent predetermined portions.

In still yet another particular case, the at least one of the plurality of objects may include two or more of the plurality of objects.

In a further particular case, the network may be a wireless network and the server may be a web server. Further, the sending the first predetermined portion may be handled using a Hyper-Text Transfer Protocol connection and the sending subsequent predetermined portions may be handled using another predetermined protocol connection after the Hyper-Text Transfer Protocol connection has closed.

According to another aspect, there is provided a method for receiving multimedia content in a client-server system in a network, wherein the multimedia content includes a plurality of objects, the method including: receiving a predetermined portion of each of the plurality of objects through the network at the client, wherein the predetermined portion is less than a complete object for at least one of the plurality of objects; and after receiving the first predetermined portion of each of the plurality of objects, successively receiving subsequent predetermined portions of each of the plurality of objects until all portions of the plurality of objects have been received.

In a particular case, the method may further include, before receiving, sending a request for multimedia content, where the request includes information related to the sending of objects. In this particular case, the information related to the sending of objects may include information related to objects for which sending is to be advanced, delayed or prevented, or information related to the ordering in which objects are to be sent, or the like.

In another particular case, the receiving of subsequent predetermined portions may occur only after sending a request for subsequent predetermined portions.

In yet another particular case, the at least one of the plurality of objects may include two or more of the plurality of objects.

In still yet another particular case, the network may be a wireless network and the client may be a mobile device. Further, the receiving a first predetermined portion may be handled using a Hyper-Text Transfer Protocol connection and the receiving subsequent predetermined portions may be handled using another predetermined protocol connection after the Hyper-Text Transfer Protocol connection has closed.

In a further particular case, the method may further include: prior to receiving, determining if the multimedia content is available in a cache; and where first predetermined portions of each of the at least one of the plurality of objects are available in the cache but subsequent predetermined portions of each of the at least one of the plurality of objects are not available in the cache, sending a request for the subsequent predetermined portions without receiving the first predetermined portions.

In the above aspects, it will be understood that the methods described may be performed by software, which may be stored on a computer-readable medium for execution by a computing device.

According to another aspect, there is provided a system for delivering multimedia content through a network, the system including: a server side sub-system configured to: concurrently send a first predetermined portion of each of the plurality of objects through the network, wherein the first predetermined portion is less than a complete object for at least one of the plurality of objects; and after sending the first predetermined portion of each of the plurality of objects, successively send subsequent predetermined portions of each of the plurality of objects until all portions of the plurality of objects have been sent; and a client side sub-system configured to: receive the first predetermined portion of each of the plurality of objects through the network; and after receiving the first predetermined portion of each of the plurality of objects, successively receive subsequent predetermined portions of each of the plurality of objects until all portions of each of the plurality of objects have been received.

In a particular case, the client side sub-system may further be configured to, before receiving, send a request for multimedia content, where the request includes information related to the sending of objects, and the server side sub-system may further be configured to receive the request and send the multimedia content in accordance with the request. In this case, the information related to the sending of objects may include information related to objects for which sending is to be advanced, delayed or prevented, information related to the ordering in which objects are to be sent, or the like.

In another particular case, the server side sub-system may further be configured to send subsequent predetermined portions only after receiving a request for the subsequent predetermined portions from the client side sub-system and the client side sub-system may further be configured to send a request for the subsequent predetermined portions based on predetermined factors.

In yet another particular case, the server side sub-system may be further configured to: prior to sending, determine if any of the plurality of objects is appropriate for division into predetermined portions; and divide each appropriate one of the plurality of objects into predetermined portions prior to sending. Further, the server side sub-system may be further configured to compress at least one of the plurality of objects that is not appropriate for division prior to sending.

In other particular cases, the network may be a wireless network, the server side sub-system may include a web server, the client side sub-system may include a web browser, the client side sub-system may include a mobile device, or other variations.

Other aspects and features will become apparent to those ordinarily skilled in the art upon review of the following description of some embodiments.

FIG. 1 illustrates a conventional system and method for delivering multimedia content using a conventional method. In particular, FIG. 1 illustrates loading a typical web page 105 from a server 110 into a web browser on a client (not shown) and displaying the web page 105 in a window on the client computer screen. In a typical internet web page 105, there are generally various multimedia objects 120, which make up the multimedia content, and that are loaded from the server 110 to the client in order to display the web page 105. For example, multimedia objects may include text 120*a*, animations 120*b*, FIGS. 120*c*, 120*d*, tables 120*e*, and the like. When a request for a particular web page is sent from the client to and received by the server 110, typically via a hyper-text transfer protocol (HTTP) connection, the server 110 begins sending the data for the web page 105 to the client. The data for each object 120 is typically sent in the order specified by the creator of the web page 105. As such, each object 120 loads into the client in the order in which it is specified in the server 110. The server 110 may also specify whether the entire web page 105 needs to be loaded before display of any objects 120 or whether objects 120 can be displayed as received. In either case, larger objects 120, including images, can slow the loading of the web page 105 because the entire object 120 must be loaded before that particular object 120 is displayed. This can result in delaying the display of the whole web page 105 or of the remaining objects 120 to be displayed. As illustrated in FIG. 1, even though objects 120*a*, 120*b*, and 120*c* on HTTP connections 1, 2 and 3 have loaded and have been displayed, object 120*d* on HTTP connection 4 has not yet been fully loaded and is being gradually displayed. Similarly, the table 120*e* has not been loaded at all as indicated by the dotted lines. This delayed display of objects 120 can be frustrating for users, particularly in situations involving objects 120 such as image maps or the like which tend to require the loading of the entire image prior to allowing the user to click on a particular area or item within the image map.

Figure 2:
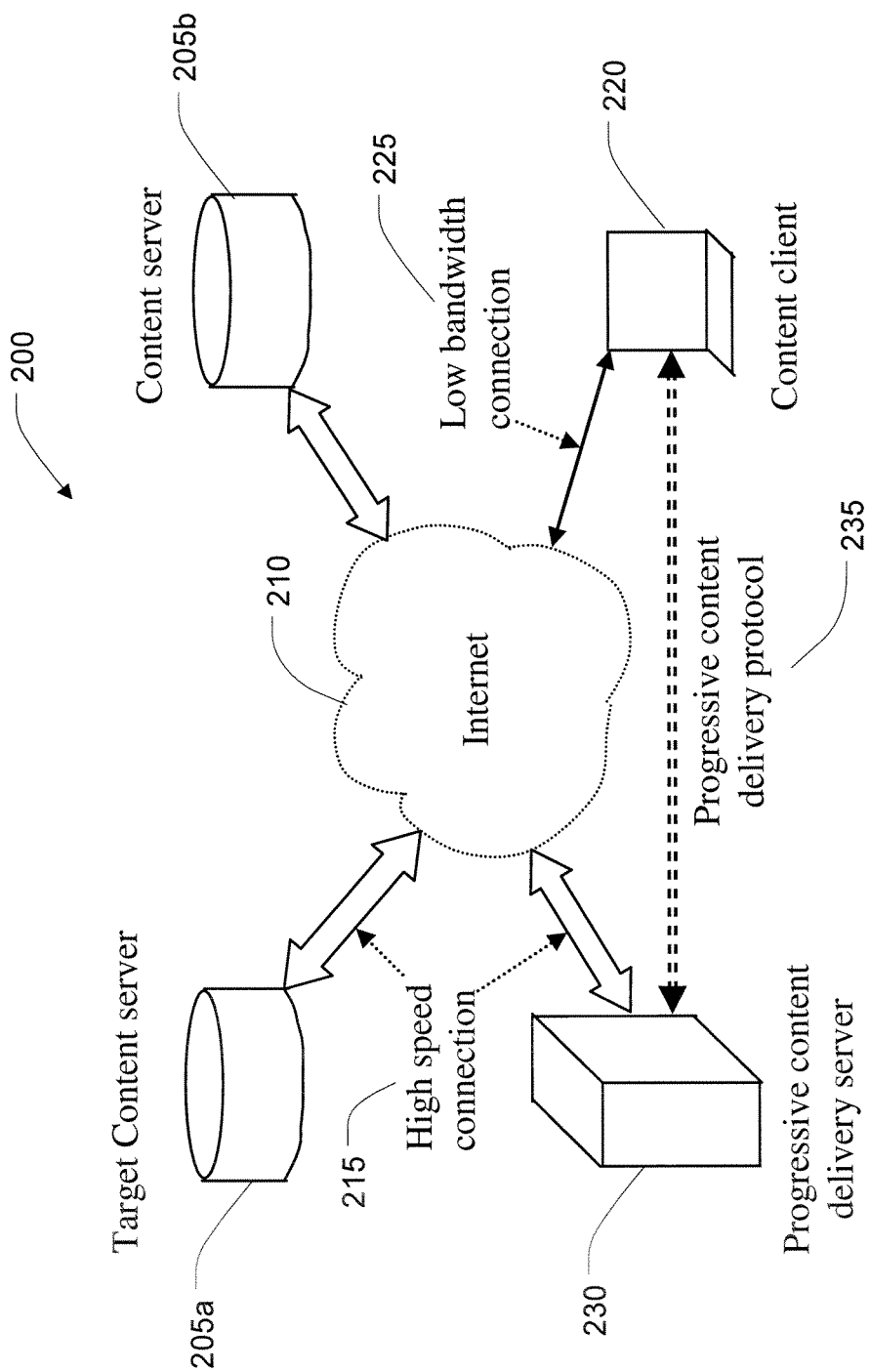
FIG. 2 is a schematic diagram of an exemplary embodiment of a system for content delivery.

FIG. 2 shows a system for delivering multimedia content 200 according to one exemplary embodiment. As shown in FIG. 2, content servers 205 are connected to the Internet 210, typically by high speed connections 215. In this example, one of the content servers 205 is designated as a target content server 205*a*. A content client 220 is also connected to the Internet 210, in this case, by a low bandwidth connection 225 such as a dial-up, wireless or the like. The content delivery system 200 includes, a progressive content delivery server 230 that fetches multimedia content on behalf of the content client 220 and, where appropriate, converts the multimedia content into an embedded (or progressive) format for use in progressive transmission and rendering. The content client 220 may need to be modified to support progressive transmission and rendering of the multimedia content, by including a client proxy (not shown) or browser plug-in (not shown), as described below.

A progressive content delivery protocol (PCDP) controls the progressive delivery of multimedia content between the progressive content delivery server 230 and the content client 220. When the content client 220 requests multimedia content, it sends a request to the progressive content delivery server 230. Upon receiving the request, the progressive content delivery server 230 fetches the multimedia content from the target content server 205*a* and, where necessary, converts the multimedia content to an embedded progressive format. Initially, only a predetermined portion of each object in the converted multimedia content is sent back to the content client 220 for rendering an initial version/portion, for example a lower quality version, of the multimedia content. The rest of the converted multimedia content data is then sent to the content client 220 in a progressive manner. As more multimedia content data arrive at the content client 220, an enhanced multimedia content is updated and rendered progressively. The progressive content delivery server 230 transforms the original multimedia content from the target content server 205*a* to suit the needs of the content client 220 for the particular type of content.

In this example, the perceived delivery speed is increased because upon receiving only a small amount of data (that is, the initial version/portion), the content client 220 is able to display a complete version of the multimedia content but at, for example, a lower resolution. While an end user is reading and/or viewing the displayed multimedia content, the displayed content becomes better and better as more embedded bits of the converted multimedia content are received until a desired resolution is reached or the maximum resolution is reached. In the perception of the end user, the multimedia content is delivered faster.

According to this exemplary embodiment, it is possible to accelerate web browsing through the concurrent delivery of portions of progressive images from web servers to web browsers. For example, in a first step, several images up to a certain low quality level are received first (in this case, a lower quality image can be considered a portion of the multimedia object, being the full quality image). As the next step, the quality of these images is improved to the next selected level of quality by receiving additional image data for these images. These steps can be repeated until all images have been received to a desired level of quality. This step-wise progressive delivery of all images in a given web page/document has the potential of providing enhanced user-satisfaction as the end user has the perception of being able to view the complete document sooner. This contrasts with conventional systems in which a long time may be required for a browser to receive a large image file from a server and other images are not received until after the large image file is fully received. Such enhanced user-satisfaction can be very important in web browsing, particularly when the underlying network is a low-bandwidth network such as dial-up or wireless.

Figure 3:
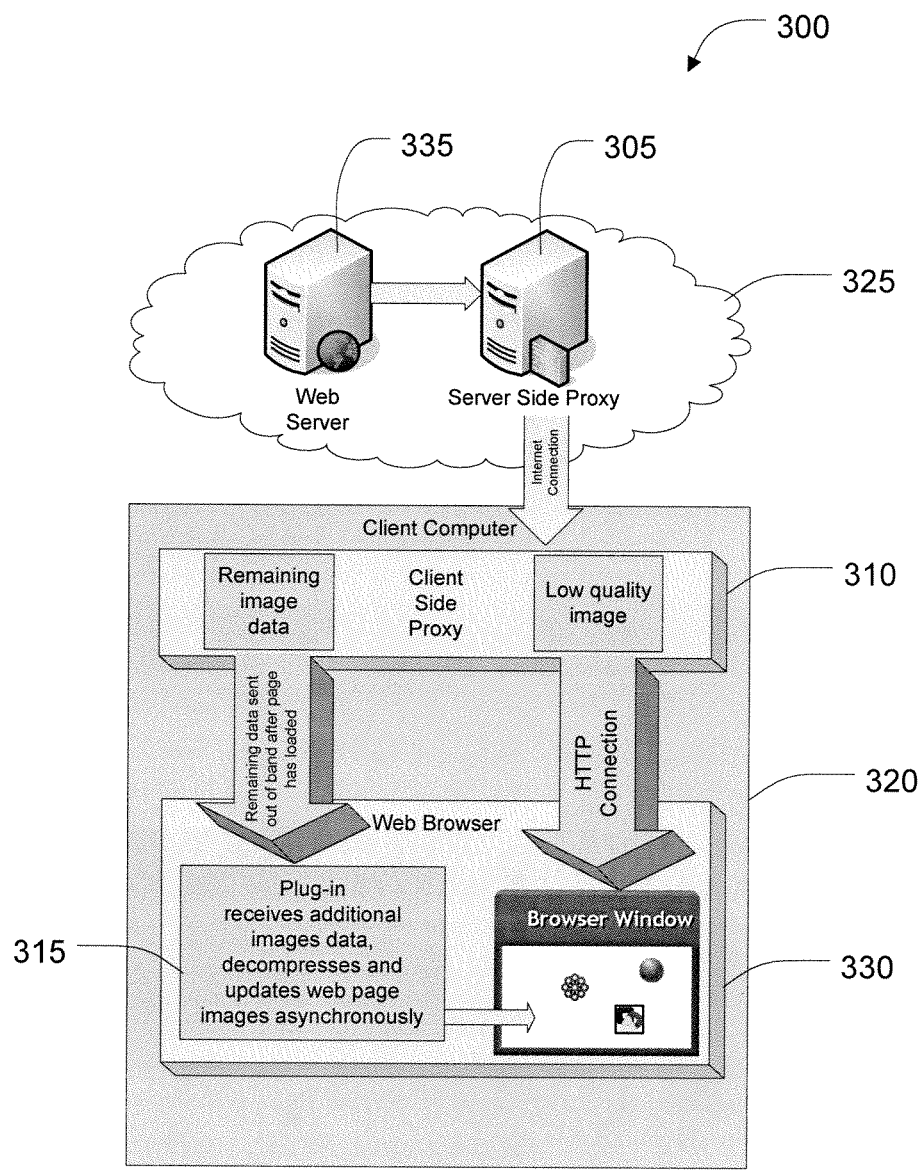
FIG. 3 is a schematic diagram showing an exemplary embodiment of a portion of the system for content delivery of FIG. 2.

FIG. 3 illustrates an exemplary embodiment of a system for delivering progressive images over a non-progressive infrastructure. As an example, a non-progressive infrastructure can be considered one where one or more of the following conditions are true:

(1) The image(s) available at the content server may not be in a format that supports progressive delivery.

(2) The content server may not deliver image data in a progressive manner.

(3) The client may not be capable of displaying the given image data in a progressive manner.

(4) The client cache may not be equipped for dealing with the cached progressive segments of the image data.

(5) The client-server protocol is designed to deliver a complete image file, whether in a single or multiple segments, in response to a request from the client and before delivering the next image.

In this exemplary embodiment, the system comprises a server side proxy 305, a client side proxy 310 and a browser plug-in 315. In particular, the client side proxy 310 and the browser plug-in 315 reside on the client computer 320, while the server side proxy 305 resides on a network 305, in this case, the Internet. In response to a request from a client web browser 330, the browser plug-in 315 first checks to see if the requested object is available in a browser cache (not shown), and if so, the object can be retrieved from the local cache. Otherwise, the request from the client web browser 330 is forwarded to the client side proxy 310 who forwards the request to the server side proxy 305, which requests a target web server 335 for the object.

After receiving the object from the web server 335, the server side proxy 305, if applicable, converts the object into an appropriate format for progressive delivery. Any object that is not suitable for progressive delivery can be sent to the client side proxy 310 in one portion. An example of an object that may be unsuitable or inappropriate for progressive delivery is an object that is below a predetermined size in data volume. For objects that can be delivered in a progressive manner, the server side proxy 305 sends the first portion of each such object to the client side proxy 310, which in turn sends it to the browser plug-in 315, which displays the objects. The client side proxy 310, if and when necessary, requests the server side proxy 305 for remaining portions of the objects. The server side proxy 305 then delivers the requested portion to the client side proxy 310. The client side proxy 310 in turn delivers the portion to the browser plug-in 315 for display via the web browser 330.

The method described above further provides for what is called "on-demand retrieval". For example, the concurrent delivery of initial portions of progressive images over the whole web page/document allows the user to quickly view the whole web page and then have the option to choose which objects to continue loading. The browser plug-in 315 and the client side proxy 305 can be configured to allow a user to specify which objects to load initially and/or continue to load, for example by user settings or by clicking on the initial version/portion of the object. The user may also have the option to specify the order in which the objects will continue loading. The on-demand retrieval of content by the client side proxy 310 from the server side proxy 305 can be used to retrieve various types of multimedia content in portions in a progressive manner, including, for example, JPEG, GIF, and PNG images, animation, audio and video, and other forms of multimedia content.

Figure 4:
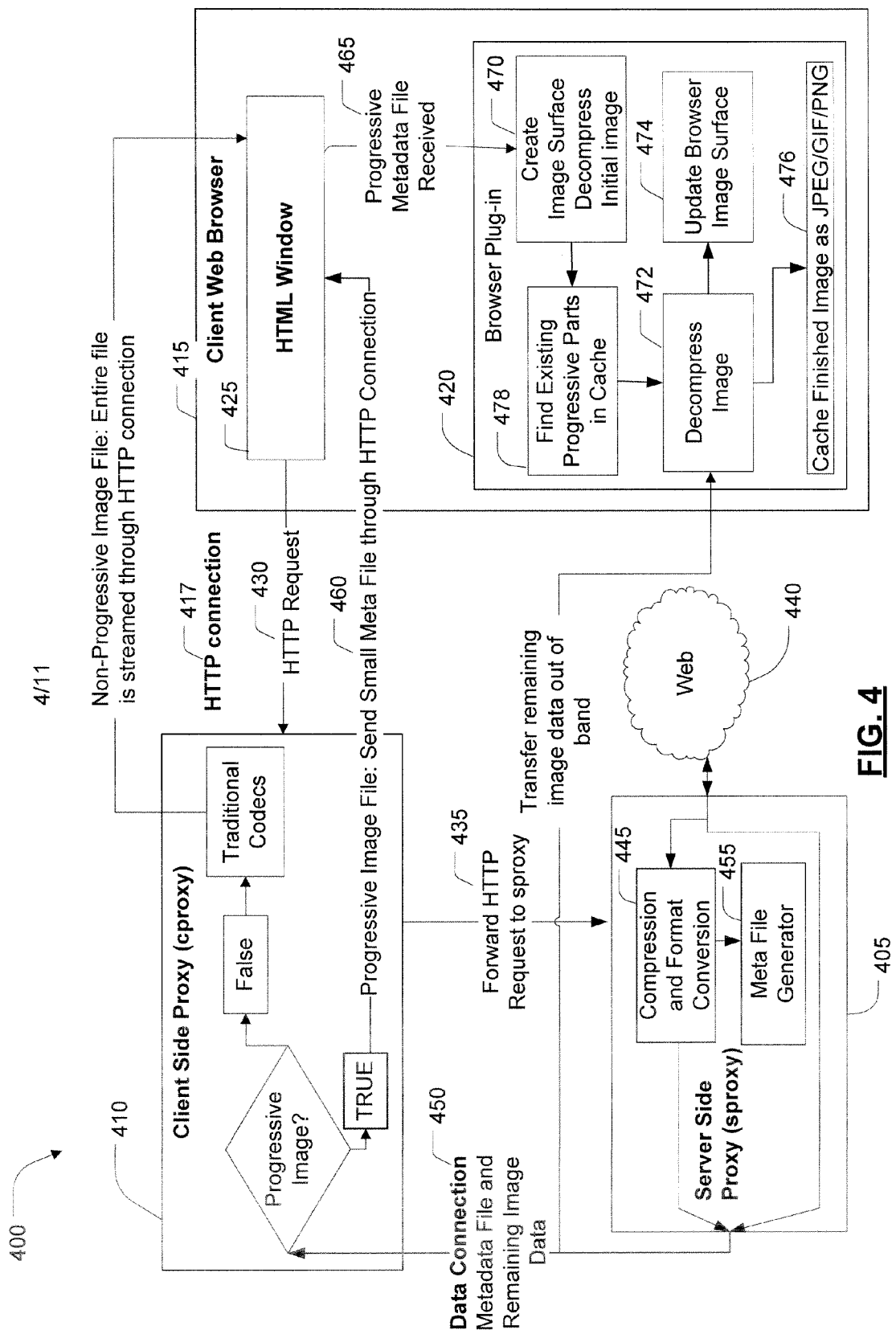
FIG. 4 is a schematic diagram showing an exemplary embodiment of an architecture and data flow for the system for content delivery of FIG. 2.

FIG. 4 illustrates an architecture and data flow for a more detailed exemplary embodiment of a system and method 400 for delivering progressive images from a server side (represented by server side proxy 405 and content server (not shown)) to a client side (represented by client side proxy 410 and a web browser 415). In this particular embodiment, the focus is on the transfer of image objects via an HTTP connection 417. Since the web browser 415 generally expects only one data file for each image object, the web browser will typically not be able to display an image progressively even though the client side proxy 410 is able to feed the web browser 415 with progressive JPEG or GIF/PNG images of increasing image quality. In such a case, a browser plug-in 420 is provided to assist with the functionality of image display. As will be understood by one of skill in the art, the browser plug-in 420 may also be incorporated directly into the web browser 415 in alternate embodiments. Similarly, the client side proxy 410 may be incorporated in the web browser 415 or browser plug-in 420 in alternate embodiments.

The functions of the browser plug-in 420 include receiving and decompressing the image bit-stream, creating the image surface that the web browser 415 will draw, and managing an on-demand mechanism for updating the image surface as additional data is received.

The following description outlines elements of the system 400 and a time sequence for a method of delivering progressive images from a web server to a web client over a non-progressive infrastructure.

Protocol Handler

The protocol handler of the browser receives an HTTP GET request (not shown) from the browser window 425 and checks the cache for existing image data (not shown). If a regular image (that is, non-progressive image) is found in the cache, the regular image file will load in the conventional non-progressive fashion and will be displayed by the web browser 415. Otherwise, the operation proceeds to an HTTP request 430.

HTTP Request

An HTTP request 425 is sent over the HTTP connection 417. The client side proxy 410 forwards the request 435 to the server side proxy 405. The server side proxy 405 retrieves data from the target content server (not shown) on the Web 440 and, if it is deemed to be a streamable/progressive image (i.e., it can be progressively delivered, for example as a progressive JPEG or GIF format or the like), then the server side proxy 405 will compress the image data (if necessary) and convert it to an embedded format for progressive delivery 445. Otherwise, data is returned unmodified over the data connection 450 to the client side proxy 410, and is then returned by the client side proxy 410 via the HTTP connection 417 to the web browser 415.

Progressive Metadata File Generation

For progressive images, a metadata file is generated 455 by the server side proxy 405. The metadata file includes, for example, the progressive image header and a predetermined portion of the image data. For example, a portion of the image date that will allow rendering of a low quality preview image. The progressive image header includes additional information such as, for example, a sequence of bytes that the web browser 415 will use to select the browser plug-in 420, the complete URL of the image file, and the image dimensions.

Metadata File Delivery

The metadata file is concurrently delivered through the data connection 450 with the non-progressive data to the client side proxy 410. The metadata file header is interpreted by the client side proxy 410 and a shared file (not shown) is created on the local hard disk (not shown). This shared file will be used by the browser plug-in 420 to receive additional image data.

Metadata File Return

The metadata file is returned 460 from the client side proxy 410 through the HTTP connection 417 to the web browser 415. The web browser 415 will examine the first few bytes of the metadata file, as well as the content-type header returned from the client side proxy 410, to determine which plug-in to invoke. Upon finding a progressive image type, the browser plug-in 420 for progressive display will be invoked.

Progressive Metadata File is Delivered to the Plug-in

The browser plug-in 420 is invoked 465 and receives the metadata file. The browser plug-in 420 verifies the integrity of the metadata file and interprets the headers.

Create Image Surface within the Browser

The browser plug-in 420 reads the metadata file header and creates an appropriately sized drawing surface, which the browser uses to draw the image, then decompresses the coarse image in the metadata file for display 470.

Open the Shared File

The shared file is opened by the browser plug-in 420. This shared file is written to by the client side proxy 410 when additional image data arrive for the image being processed.

Receive Progressive Image

The server side proxy 405 transmits remaining portions of the progressive image data to the client side proxy 410 based on a predetermined progressive content delivery protocol (PCDP). The PCDP is described later in this section. The client side proxy 410 writes the received image data to the shared file.

Marshal and Decompress the Progressive Image

As additional image data are written to the shared file, the browser plug-in 420 is signaled to read the file. If the browser plug-in 420 determines that there are sufficient data in the shared file to proceed, it decompresses the image using the available additional data 472.

Update Browser Image Surface

The browser plug-in 420 finds the browser surface associated with the image being processed, then updates the surface with the latest image 474 and repaints the HTML window 425. If the surface is no longer present or has been destroyed, it sends a message to the client side proxy 410 to stop receiving data for that image. In turn, the client side proxy 410 forwards the message to the server side proxy 405 to terminate the transmission of additional image data.

Cache Finished Image

After all data for the image have been received, the browser plug-in 420 converts the final image to its original format, such as JPEG or GIF/PNG, and commits it to the browser cache 476. The browser plug-in 420 can then delete the shared file. In this case, the web browser 415 can then no longer invoke the browser plug-in 420 for this image until the cache entry is deleted or expires.

In some instances, for example when a progressive image is only partially received before termination of the transmission of all progressive portions, there may already be a shared file containing some progressive portions in the browser cache. In this case, the browser plug-in 420 may retrieve these progressive portions from the cache 478 and decompress them 472 for display 474. The browser plug-in 420 can then communicate this situation to the client side proxy 410 through the PCDP Converting Objects/Images into Embedded Format In order to support the progressive image transmission and display over a non-progressive infrastructure, the JPEG and GIF/PNG image format will need to be converted to an embedded format. In this case, the conversion is performed at the server side proxy 405.

Generally speaking, there are four different types of progressive delivery schemes: the quality-based progressive scheme (the image starts at a lower quality and the image quality increases as more image data is received), the resolution-based progressive scheme (the image is displayed in a smaller size and the image dimension increases as more image data are received), the color-based progressive scheme (the image starts loading as a grayscale image and the color will fill in as more image data are received), and position-based progressive scheme (a region of interest of the image is displayed first and more regions are displayed as more image data are received). Although the present description deals with quality-based progressive delivery of image data, which is considered to be more appropriate for web access over the Internet, the method is believed to work equally well with other progressive types.

As an example of progressive encoding, a JPEG image can be converted to a quality based progressive format by a plurality of algorithms such as zerotree coefficient coding (U.S. Pat. No. 5,315,670 by J. M. Shapiro), SPIHT image compression algorithm (A. Said and W. A. Pearlman, "A New Fast and Efficient Image Codec Based on Set Partitioning in Hierarchical Trees," *IEEE Transactions on Circuits and Systems for Video Technology*, vol. 6, pp. 243-250, June 1996), JPEG2000 standard, etc. Also, a GIF/PNG image can be converted to the quality based progressive format by the distortion-based color splitting algorithm (X. Chen, S. Kwong, and J. Feng, "A new compression scheme for color-quantized images," *IEEE Transactions on Circuits and System for Video Technology*, Vol. 12, No. 10, pp. 904–908, October 2002) or the entropy constrained color splitting algorithm (a method invented by some of the inventors of the present application and described in U.S. Provisional Application 60/719,585 and regular U.S. patent application Ser. Nos. 11/534,956 and 11/534,942, both filed Sep. 25, 2006, claiming priority therefrom, all of which are hereby incorporated herein by reference).

To support progressive image display, the server side proxy 405 converts all the web images, for example in JPEG and GIF/PNG format, to a progressive embedded format in the sense that the bit stream for a lower image quality is generally embedded in the bit stream for a higher image quality. In other words, with this arrangement of data, the decoder (in the client side proxy 410 or browser plug-in 420, for example) is ideally able to reconstruct an image with higher quality any time it receives any amount of new image data. However, in some embodiments, it is useful if the decoder does not reconstruct a better quality image for progressive display each time it receives new image data. There are two main reasons why it may be useful to update an image in a step-wise fashion rather than continuously. First, if the newly received image data is a small amount, the improvement on the reconstructed image may be unnoticeable. Second, if the decoder spends too much CPU time to reconstruct an image for updating, it may slow down the loading of the web page or other applications. To assist the decoder on determining when to reconstruct a refined image for display, the server side proxy 405 in this embodiment calculates the number of images recommended for progressive display and the bit length offsets for each recommended image quality based on the statistics of the given image. The principle of marking the compressed image bit stream into predetermined portions is to achieve a rough linear increase of the visual quality on the reconstructed image for each portion.

In the case of a JPEG image, since a wavelet transform based algorithm is most likely used to generate an embedded bit stream, the resulting bit planes can be utilized to mark the bit stream and, hence, the number of recommended images for progressive display. For example, if an image is desired to be progressively updated four times to the specified quality level (i.e., five portions are desirable), the bit length offsets can be set as the compressed bit lengths at the end of the $4^{th}$, $3^{rd}$, $2^{nd}$ bit plane, the middle and the end of $1^{st}$ bit plane (in this case, the bits corresponding to the $1^{st}$ bit plane, i.e., the most insignificant bit plane, are put into two portions). Note that the wavelet coefficients may also be quantized first based on the user's preference.

For a GIF/PNG image, the server side proxy 405 may convert the image to an embedded bit stream based on various color splitting algorithms. The number of generated colors during the splitting process is used to mark the bit stream and, hence, the number of recommended images for the progressive display. Since the human visual system is typically more sensitive to the number of shades when the total number of colors is small, it is suggested that an updating image be reconstructed when the generated number of colors reaches 4, 8, 16, 32, 64, and 128, respectively. The bit length offsets are the compressed bit length at the end of compressing the $4^{th}$, $8^{th}$, $16^{th}$, $32^{nd}$, $64^{th}$, and $128^{th}$ color.

It is worth pointing out that the number of bit-stream portions as well as the corresponding dividing points can be arbitrarily set in accordance with specific application requirements. The purpose of adding the number of recommended images for progressive display as well as the corresponding bit offsets at the beginning of the embedded bit-stream is to assist the client to decide whether and when to reconstruct a refined image for updating.

On-Demand Delivery of Multimedia Content

Under the HTTP connections used by common web browsers, the content are delivered by the server to the client in response to the client's request. However, in the system described above, the client only receives the first portion of the object in response to its request for a particular data object. The remaining portions of the object are delivered according to a communication protocol between the server side proxy 405 and client side proxy 410. This protocol is referred to as the progressive content delivery protocol (PCDP).

Depending on the needs of a particular application, there are several possible embodiments of PCDP. Thus, PCDP can be used to implement a customized on-demand delivery of multimedia content from a web content server to a web browser.

In one particular embodiment of PCDP, the system described above can be used for concurrent delivery of all the images on a page in a progressive step-wise manner. Once the metafile including the first portion for all the images for a web page have been delivered to the web browser 415, the client side proxy 410 sends a message to server side proxy 405 to send the subsequent portions for all the images to bring the quality of all the images to a predetermined level. After receiving the requested portions from the server side proxy 405, the client side proxy 410 may request further portions for further enhancing the quality of the images. In another variation in the embodiment of this protocol, the client side proxy 410 may select certain images and request server side proxy 405 for further portions for enhancing the quality of these images only. Thus, the progressive portions for select images can be demanded by client side proxy 410 in an order that is suitable for a particular web page or browser based application.

Figure 5A:
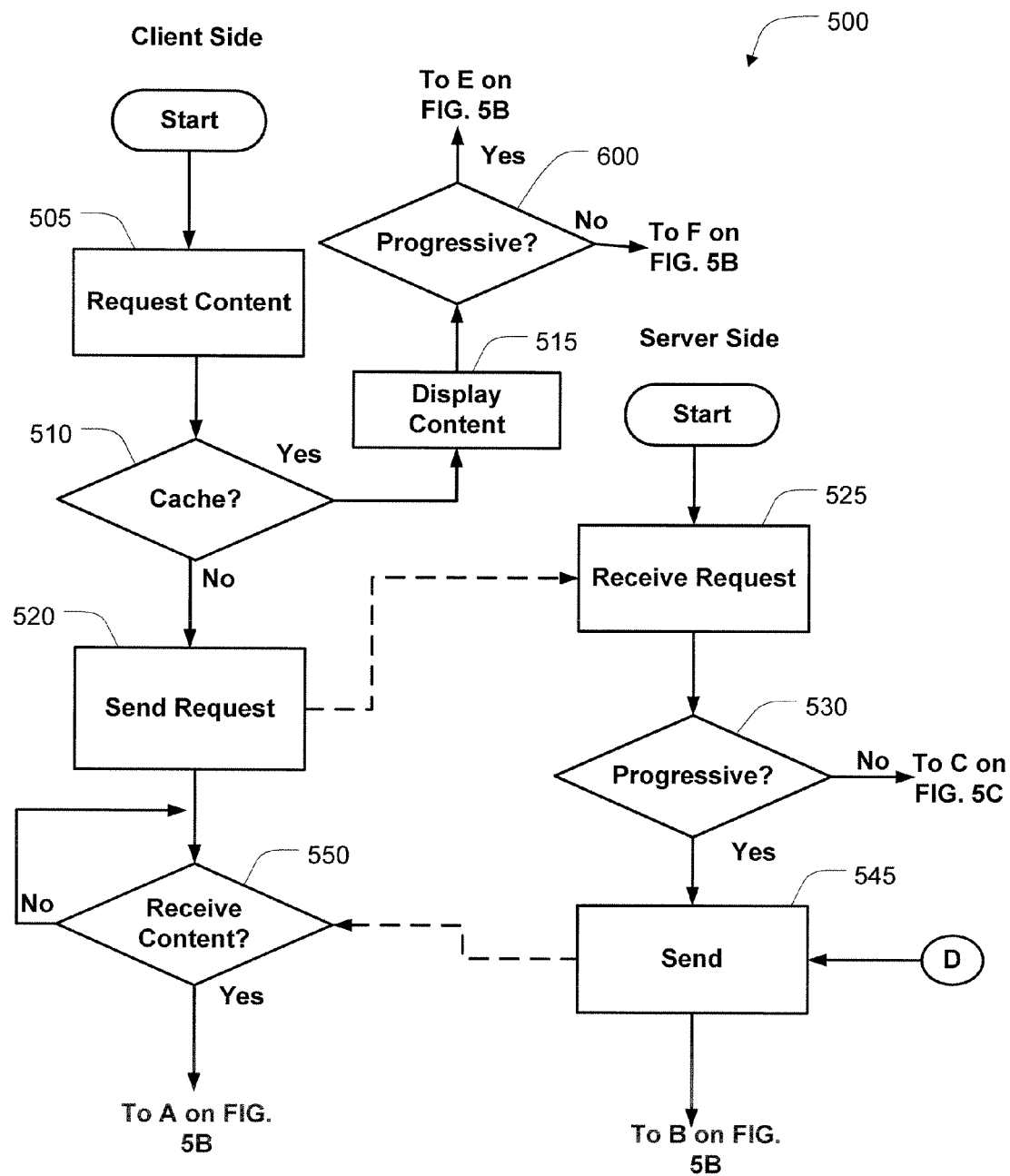
FIG. 5 is a flowchart showing an exemplary method for content delivery in a network.
Figure 5B:
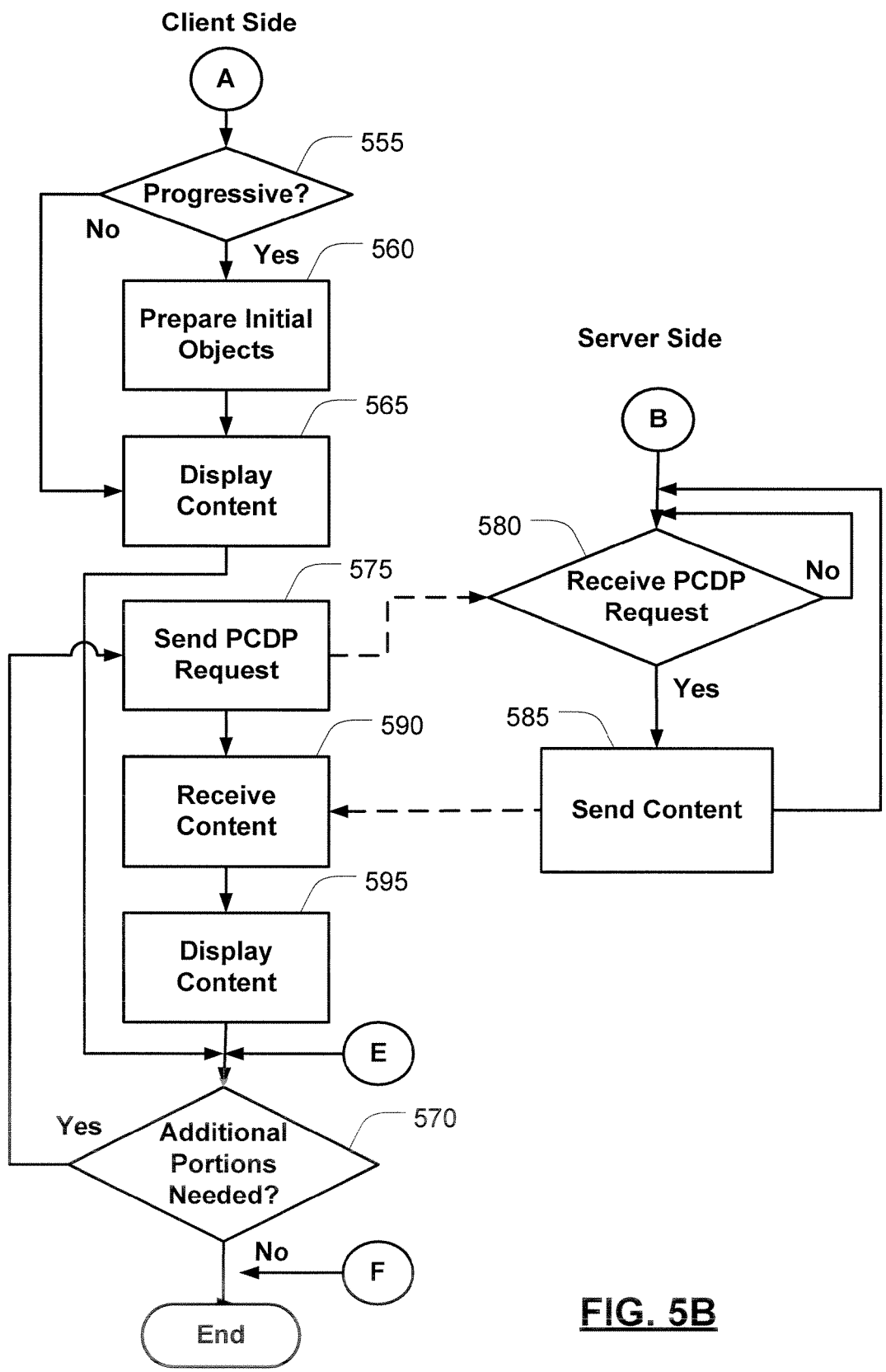
Figure 5C:
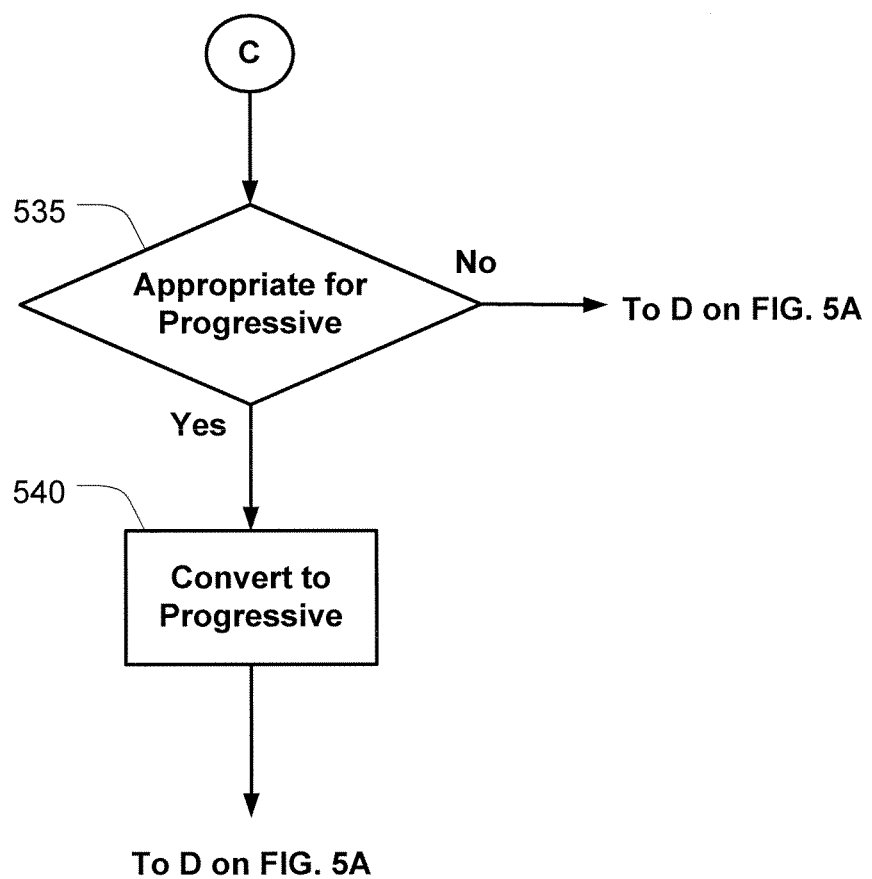

FIG. 5 is a flowchart illustrating a method of delivering multimedia content through a network 500. The flowchart is divided among FIGS. 5A, 5B and 5C and, as shown in FIGS. 5A and 5B, there are two streams, a client side stream and a server side stream. The client side stream represents, for example, the client side proxy 410 and client web browser 415 as described above while the server side stream represents, for example, the server side proxy 405 and the target server, also as described above. It will be understood by one of skill in the art that the various functions can be performed by different elements depending on the particular implementation.

Initially, a request for multimedia content, such as an HTTP request, is formulated on the client side (505). The client side then checks its cache to determine if the requested multimedia content, or some displayable objects, or portions thereof (as explained in further detail below), is already available and does not need to be updated (510). If the multimedia content is available, it is displayed at the client side (515). If the multimedia content is not available, or some objects are still required to fulfill the request, a request for the multimedia content is sent to the server side (520).

At the server side, a request for multimedia content is received (525). The server side first determines if any objects in the multimedia content are in a progressive format (530). If not in progressive format, the server side determines if any objects in the multimedia content are appropriate to be converted into a progressive format (535). If so, the conversion is performed and a meta-file representing an initially displayable portion of the object is prepared (540). Any objects in the multimedia content that are not appropriate for conversion to a progressive format can be sent to the client side in their entirety, without progressive format conversion but with or without compression.

Once the progressive objects have been prepared, the server side then sends the meta-files and the non-progressive objects (compressed or otherwise) to the client side (545).

The client side then receives the meta-files and non-progressive objects from the server side (550). It will be understood that the client side will generally save the received objects and meta-files into a cache or the like. The client side then checks to determine which of the objects are progressive objects, that is, provided in a meta-file format (555). For those progressive objects, the client side prepares an image space/shared file (560) and proceeds to display the portion of the progressive object that is provided in the meta-file for each of the progressive objects (565). The client side is also concurrently displaying non-progressive objects (565). Once each of the progressive objects and non-progressive objects has been displayed, the client side determines if additional portions are needed for any of the progressive objects (570). If so, the client side sends a PCDP request to the server side (575).

The server side receives the PCDP request (580) and sends a subsequent portion of each of the progressive objects to the client side (585).

The client side receives the subsequent portion of the progressive objects (590) and updates the display of each of the progressive objects with the additional data in the subsequent portion (595). The client side then again determines if additional portions of the progressive objects are still needed (570). For example, the client side may check user settings, determine whether or not the user has moved to a subsequent web page or may make some determination of the capability of the client side equipment, for example, to display images of a certain quality or the like. If the user has set a predetermined level of resolution desired, moved to a different web page or if the client side equipment has limited resolution, the client side may not request subsequent portions. If additional portions are required, the client side sends additional PCDP requests to the server side (575).

The server side continues to accept and respond to PCDP requests received from the client side for further portions of the progressive objects that are required to fulfill the original request. In a particular case, if the client side returns to multimedia content (e.g. a web page) that includes progressive objects that were not fully loaded during a first request, the client side may load some objects of the multimedia content from a cache and display them as in (515) above. The client side may then determine if any of the objects in the cache are progressive objects (600) and, if so, determine if additional portions are needed (570) and, if so, send a PCDP request to the server side to load subsequent portions of progressive objects on the web page (575).

In another exemplary embodiment, the system described above can also be used together with an alternative PCDP to deliver a Flash™ object from a web server to a web browser. In this exemplary embodiment, the client side proxy modifies the HTTP request header to indicate that, for Flash objects (SWF files), the server side proxy will initially send a meta-file comprising, for example, a preview GIF or JPEG image file. Upon receiving this request, the server side proxy requests and receives the Flash object from the target content server, caches it locally, but only sends a preview JPEG and GIF image created from the received Flash object. This meta-file is delivered to the client side proxy which, in turn, delivers the preview image file to the Flash player within the browser. The Flash player then displays the image in the browser.

After the initial objects on the web page have loaded, the plug-in reviews the current page for flash objects. For each flash object found, the URL can be modified to indicate that the full Flash object is now needed (as opposed to the preview Flash object request). This new URL is fed back into the server to reload the flash stream using a new HTTP request. The browser sends the request to the server side proxy via the client side proxy. The server side proxy, upon seeing a request for the full Flash object will return the full Flash object (either from its local cache or after retrieving it from the target web server). The full Flash object will be displayed inside the browser. As another variation of this example, the plug-in may decide if and when to demand a particular full Flash object from the server side proxy based on, for example, user settings or some form of user indication such as clicking on the desired object, or the like.

In the above embodiments, the ability to receive the delivery of data in an on-demand fashion through PCDP between client side proxy and server side proxy can also be similarly used to rearrange the order of delivery of other types of multimedia content such as audio objects, video objects and other types of multimedia objects. It will also be understood that the nature of the preview meta-file and its treatment by PCDP will vary somewhat depending on the type of object. For example, a video object may be handled in a similar way to a Flash object, wherein an image selected from the video file may be used for the meta-file and a further request via PCDP will then load the full video object.

Embodiments of the invention are intended to provide systems and methods for:

(1) delivering progressive image/multimedia data for the purpose of enhanced user experience and perceived speed up in network applications including web-browsing.

(2) delivering progressive image/multimedia data in cases where the original web content server's image data is not in the progressive form;

(3) delivering progressive image/multimedia data in cases where the web browser is not capable of displaying images progressively;

(4) delivering all the progressive images/multimedia data on a web page in a concurrent manner whereby quality of all the images is enhanced in stages;

(5) updating the images/multimedia data on a web page for the purpose of progressive updates, even after the HTTP connection that requested the said data, has closed;

(6) delivering progressive images/multimedia data to a web browser on a second access to a web page by:
 (a) delivering the image/multimedia data from the browser's cache; and
 (b) delivering progressive images/multimedia data to the web browser on the second access whereby some segments of the image/multimedia data are retrieved from the browser's cache while the rest are received from the internet;

(7) requesting multimedia content such as animations (e.g., Flash objects), audio and video content whereby only the first segment of data pertaining to a request is delivered in response to a HTTP request by a browser. The remaining data for the object is delivered separately in response to a request from the client side; and (8) on-demand delivery of multimedia content from a web server to a web browser based on a customized protocol.

As described above, embodiments herein generally relate to delivering concurrent and progressive delivery of data for predetermined/selected types of multimedia content on a web page in stages for the purpose of enhanced user experience and perceived acceleration in web browsing speed. Particular embodiments relate to a method, system, and product for concurrent delivery of progressive images/multimedia data from a web server to a web client (i.e. web browser) when one or more of the following conditions are true:

(1) The image/multimedia data available at the content server may not be in a format that supports progressive delivery.

(2) The content server may not deliver the image/multimedia data in a progressive manner.

(3) The client may not be capable of displaying the given image/multimedia data in a progressive manner.

(4) The client cache may not be equipped with dealing with the cached progressive segments of the image/multimedia data.

(5) Client-server protocol is designed to deliver a complete image/multimedia file whether in a single or multiple segments in response to a request from the client.

The embodiments are also intended to provide a method and system for arranging on-demand delivery of multi-media content whereby a modified first portion of multimedia content is delivered in response to a request by the browser for such content. The content for the remaining portions is delivered upon request by the plug-in whereby such content is sent based on a customized protocol.

The above embodiments can be deployed in various network configurations, including both wired and wireless networks. The following description relates to an exemplary wireless environment in which the above embodiments can be deployed. The wireless environment includes a mobile wireless communication device, hereafter referred to as a mobile device. Examples of applicable communication devices include pagers, cellular phones, cellular smartphones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems in a mobile environment, reference will now be made to FIGS. 6 through 9.

Figure 6:
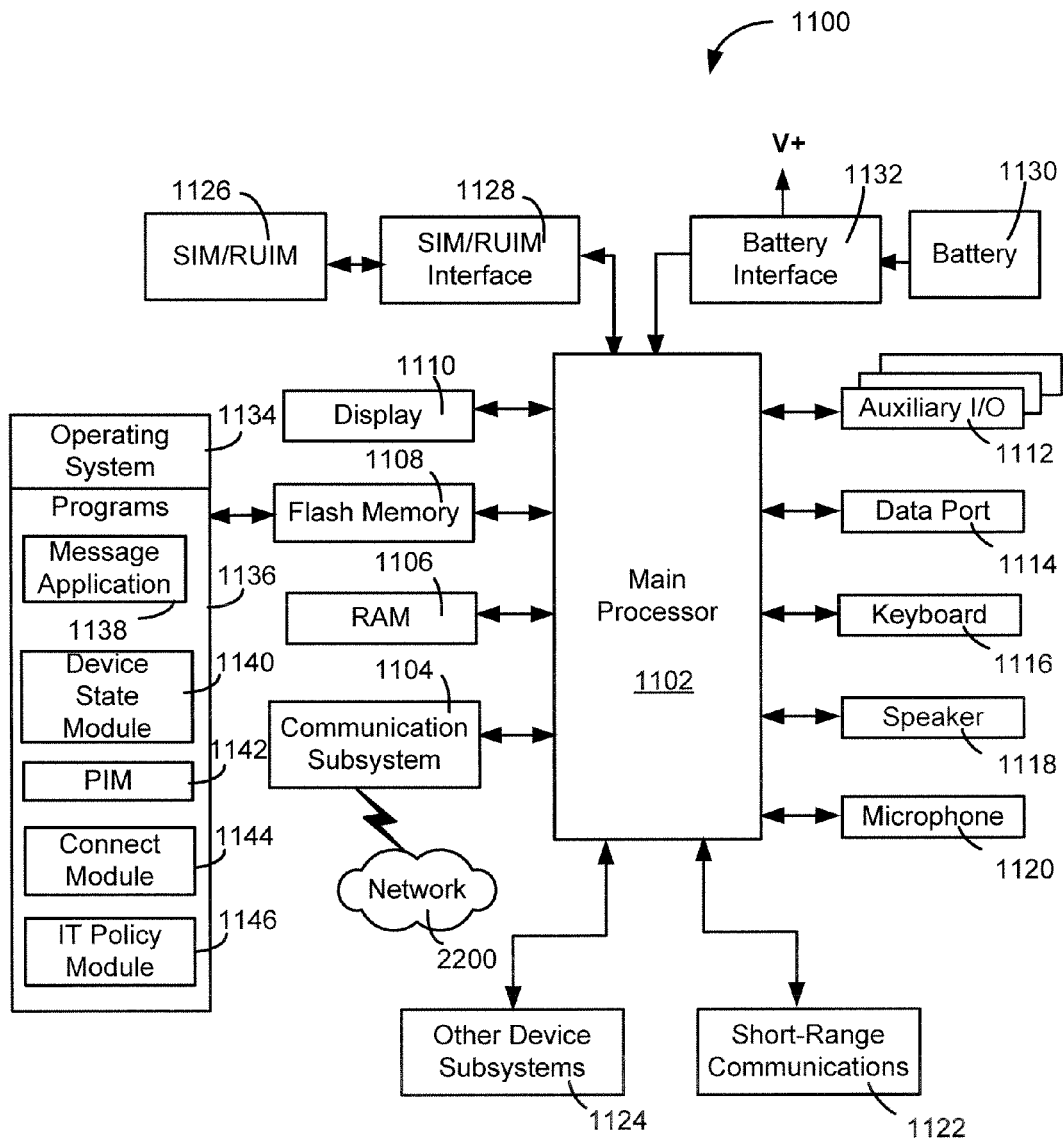
FIG. 6 is a block diagram of an exemplary mobile device, which may act as a client in the exemplary embodiments.

Referring first to FIG. 6, shown therein is a block diagram of an exemplary embodiment of a mobile device 1100. The mobile device 1100 includes a number of components such as a main processor 1102 that controls the overall operation of the mobile device 1100. Communication functions, including data and voice communications, are performed through a communication subsystem 1104. The communication subsystem 1104 receives messages from and sends messages to a wireless network 2200. In this exemplary embodiment of the mobile device 1100, the communication subsystem 1104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 1104 with the wireless network 2200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 2200 associated with mobile device 1100 is a GSM/GPRS wireless network in one exemplary implementation, other wireless networks may also be associated with the mobile device 1100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 1102 also interacts with additional subsystems such as a Random Access Memory (RAM) 1106, a flash memory 1108, a display 1110, an auxiliary input/output (I/O) subsystem 1112, a data port 1114, a keyboard 1116, a speaker 1118, a microphone 1120, short-range communications 1122 and other device subsystems 1124.

Some of the subsystems of the mobile device 1100 perform communication-related functions, whereas other subsystems may provide "resident" or on-device functions. By way of example, the display 1110 and the keyboard 1116 may be used for both communication-related functions, such as entering a text message for transmission over the network 2200, and device-resident functions such as a calculator or task list.

The mobile device 1100 can send and receive communication signals over the wireless network 2200 after required network registration or activation procedures have been completed. Network access is associated with a subscriber or user of the mobile device 1100. To identify a subscriber, the mobile device 1100 requires a SIM/RUIM card 1126 (i.e. Subscriber Identity Module or a Removable User Identity Module) to be inserted into a SIM/RUIM interface 1128 in order to communicate with a network. The SIM card or RUIM 1126 is one type of a conventional "smart card" that can be used to identify a subscriber of the mobile device 1100 and to personalize the mobile device 1100, among other things. Without the SIM card 1126, the mobile device 1100 is not fully operational for communication with the wireless network 200. By inserting the SIM card/RUIM 1126 into the SIM/RUIM interface 1128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 1126 includes a processor and memory for storing information. Once the SIM card/RUIM 1126 is inserted into the SIM/RUIM interface 1128, it is coupled to the main processor 1102. In order to identify the subscriber, the SIM card/RUIM 1126 can include some user parameters such as an International Mobile Subscriber Identity (IMSI). An advantage of using the SIM card/RUIM 1126 is that a subscriber is not necessarily bound by any single physical mobile device. The SIM card/RUIM 1126 may store additional subscriber information for a mobile device as well, including datebook (or calendar) information and recent call information. Alternatively, user identification information can also be programmed into the flash memory 1108.

The mobile device 1100 is a battery-powered device and includes a battery interface 1132 for receiving one or more rechargeable batteries 1130. In at least some embodiments, the battery 1130 can be a smart battery with an embedded microprocessor. The battery interface 1132 is coupled to a regulator (not shown), which assists the battery 1130 in providing power V+ to the mobile device 1100. Although current technology makes use of a battery, future technologies such as micro fuel cells may provide the power to the mobile device 1100.

The mobile device 1100 also includes an operating system 1134 and software components 1136 to 1146 which are described in more detail below. The operating system 1134 and the software components 1136 to 1146 that are executed by the main processor 1102 are typically stored in a persistent store such as the flash memory 1108, which may alternatively be a read-only memory (ROM) or similar storage element (not shown). Those skilled in the art will appreciate that portions of the operating system 1134 and the software components 1136 to 1146, such as specific device applications, or parts thereof, may be temporarily loaded into a volatile store such as the RAM 1106. Other software components can also be included, as is well known to those skilled in the art.

The subset of software applications 1136 that control basic device operations, including data and voice communication applications, will normally be installed on the mobile device 1100 during its manufacture. Other software applications include a message application 1138 that can be any suitable software program that allows a user of the mobile device 1100 to send and receive electronic messages. Various alternatives exist for the message application 1138 as is well known to those skilled in the art. Messages that have been sent or received by the user are typically stored in the flash memory 1108 of the mobile device 1100 or some other suitable storage element in the mobile device 1100. In at least some embodiments, some of the sent and received messages may be stored remotely from the device 1100 such as in a data store of an associated host system that the mobile device 1100 communicates with.

The software applications can further include a device state module 1140, a Personal Information Manager (PIM) 1142, and other suitable modules (not shown). The device state module 1140 provides persistence, i.e. the device state module 1140 ensures that important device data is stored in persistent memory, such as the flash memory 1108, so that the data is not lost when the mobile device 1100 is turned off or loses power.

The PIM 1142 includes functionality for organizing and managing data items of interest to the user, such as, but not limited to, e-mail, contacts, calendar events, voice mails, appointments, and task items. A PIM application has the ability to send and receive data items via the wireless network 2200. PIM data items may be seamlessly integrated, synchronized, and updated via the wireless network 2200 with the mobile device subscriber's corresponding data items stored and/or associated with a host computer system. This functionality creates a mirrored host computer on the mobile device 1100 with respect to such items. This can be particularly advantageous when the host computer system is the mobile device subscriber's office computer system.

The mobile device 1100 also includes a connect module 1144, and an IT policy module 1146. The connect module 1144 implements the communication protocols that are required for the mobile device 1100 to communicate with the wireless infrastructure and any host system, such as an enterprise system, that the mobile device 1100 is authorized to interface with. Examples of a wireless infrastructure and an enterprise system are given in FIGS. 8 and 9, which are described in more detail below.

The connect module 1144 includes a set of APIs that can be integrated with the mobile device 1100 to allow the mobile device 1100 to use any number of services associated with the enterprise system. The connect module 1144 allows the mobile device 1100 to establish an end-to-end secure, authenticated communication pipe with the host system. A subset of applications for which access is provided by the connect module 1144 can be used to pass IT policy commands from the host system to the mobile device 1100. The mobile device 1100 can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. This can be done in a wireless or wired manner. These instructions can then be passed to the IT policy module 1146 to modify the configuration of the device 1100. Alternatively, in some cases, the IT policy update can also be done over a wired connection.

The IT policy module 1146 receives IT policy data that encodes the IT policy. The IT policy module 1146 then ensures that the IT policy data is authenticated by the mobile device 1100. The IT policy data can then be stored in the flash memory 1106 in its native form. After the IT policy data is stored, a global notification can be sent by the IT policy module 1146 to all of the applications residing on the mobile device 1100. Applications for which the IT policy may be applicable then respond by reading the IT policy data to look for IT policy rules that are applicable.

The IT policy module 1146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 1146 can determine which applications are affected by the IT policy data and send a notification to only those applications. In either of these cases, for applications that aren't running at the time of the notification, the applications can call the parser or the IT policy module 1146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 1146 sends an acknowledgement back to the host system to indicate that the IT policy data was received and successfully applied.

Other types of software applications can also be installed on the mobile device 1100. These software applications can be third party applications, which are added after the manufacture of the mobile device 1100. Examples of third party applications include games, calculators, utilities, etc.

The additional applications can be loaded onto the mobile device 1100 through at least one of the wireless network 2200, the auxiliary I/O subsystem 1112, the data port 1114, the short-range communications subsystem 1122, or any other suitable device subsystem 1124. This flexibility in application installation increases the functionality of the mobile device 1100 and may provide enhanced on-device functions, communication-related functions, or both. For example, secure communication applications may enable electronic commerce functions and other such financial transactions to be performed using the mobile device 1100.

The data port 1114 enables a subscriber to set preferences through an external device or software application and extends the capabilities of the mobile device 1100 by providing for information or software downloads to the mobile device 1100 other than through a wireless communication network. The alternate download path may, for example, be used to load an encryption key onto the mobile device 1100 through a direct and thus reliable and trusted connection to provide secure device communication.

The data port 1114 can be any suitable port that enables data communication between the mobile device 1100 and another computing device. The data port 1114 can be a serial or a parallel port. In some instances, the data port 1114 can be a USB port that includes data lines for data transfer and a supply line that can provide a charging current to charge the battery 1130 of the mobile device 1100.

The short-range communications subsystem 1122 provides for communication between the mobile device 1100 and different systems or devices, without the use of the wireless network 2200. For example, the subsystem 1122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 1104 and input to the main processor 1102. The main processor 1102 will then process the received signal for output to the display 1110 or alternatively to the auxiliary I/O subsystem 1112. A subscriber may also compose data items, such as e-mail messages, for example, using the keyboard 1116 in conjunction with the display 1110 and possibly the auxiliary I/O subsystem 1112. The auxiliary subsystem 1112 may include devices such as: a touch screen, mouse, track ball, infrared fingerprint detector, or a roller wheel with dynamic button pressing capability. The keyboard 1116 is preferably an alphanumeric keyboard and/or telephone-type keypad. However, other types of keyboards may also be used. A composed item may be transmitted over the wireless network 2200 through the communication subsystem 1104.

For voice communications, the overall operation of the mobile device 1100 is substantially similar, except that the received signals are output to the speaker 1118, and signals for transmission are generated by the microphone 1120. Alternative voice or audio I/O subsystems, such as a voice message recording subsystem, can also be implemented on the mobile device 1100. Although voice or audio signal output is accomplished primarily through the speaker 1118, the display 1110 can also be used to provide additional information such as the identity of a calling party, duration of a voice call, or other voice call related information.

Figure 7:
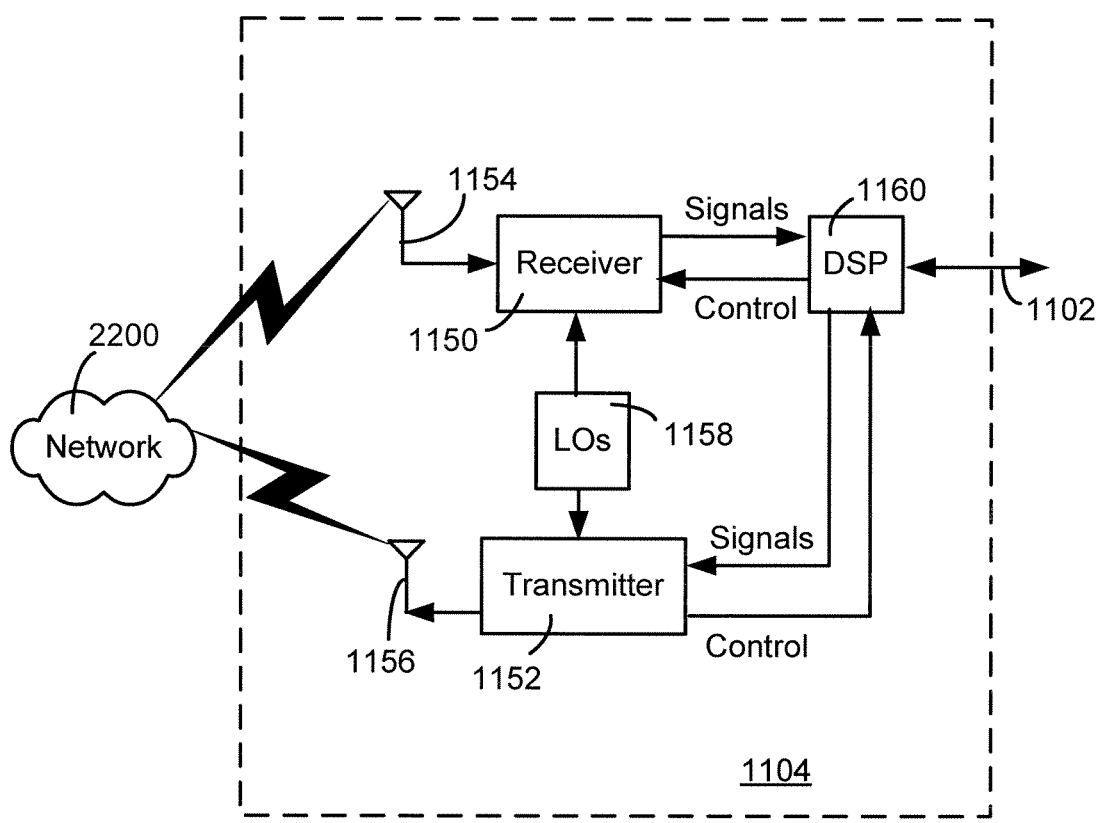
FIG. 7 is a block diagram of an exemplary communication subsystem component of the mobile device of FIG. 6.

Referring now to FIG. 7, an exemplary block diagram of the communication subsystem component 1104 is shown. The communication subsystem 1104 includes a receiver 1150, a transmitter 1152, as well as associated components such as one or more embedded or internal antenna elements 1154 and 1156, Local Oscillators (LOs) 1158, and a processing module such as a Digital Signal Processor (DSP) 1160. The particular design of the communication subsystem 1104 is dependent upon the communication network 2200 with which the mobile device 1100 is intended to operate. Thus, it should be understood that the design illustrated in FIG. 7 serves only as one example.

Signals received by the antenna 1154 through the wireless network 2200 are input to the receiver 1150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 1160. In a similar manner, signals to be transmitted are processed, including modulation and encoding, by the DSP 1160. These DSP-processed signals are input to the transmitter 1152 for digital-to-analog (D/A) conversion, frequency up conversion, filtering, amplification and transmission over the wireless network 2200 via the antenna 1156. The DSP 1160 not only processes communication signals, but also provides for receiver and transmitter control. For example, the gains applied to communication signals in the receiver 1150 and the transmitter 1152 may be adaptively controlled through automatic gain control algorithms implemented in the DSP 1160.

The wireless link between the mobile device 1100 and the wireless network 2200 can contain one or more different channels, typically different RF channels, and associated protocols used between the mobile device 1100 and the wireless network 2200. An RF channel is a limited resource that must be conserved, typically due to limits in overall bandwidth and limited battery power of the mobile device 1100.

When the mobile device 1100 is fully operational, the transmitter 1152 is typically keyed or turned on only when it is transmitting to the wireless network 2200 and is otherwise turned off to conserve resources. Similarly, the receiver 1150 is periodically turned off to conserve power until it is needed to receive signals or information (if at all) during designated time periods.

Figure 8:
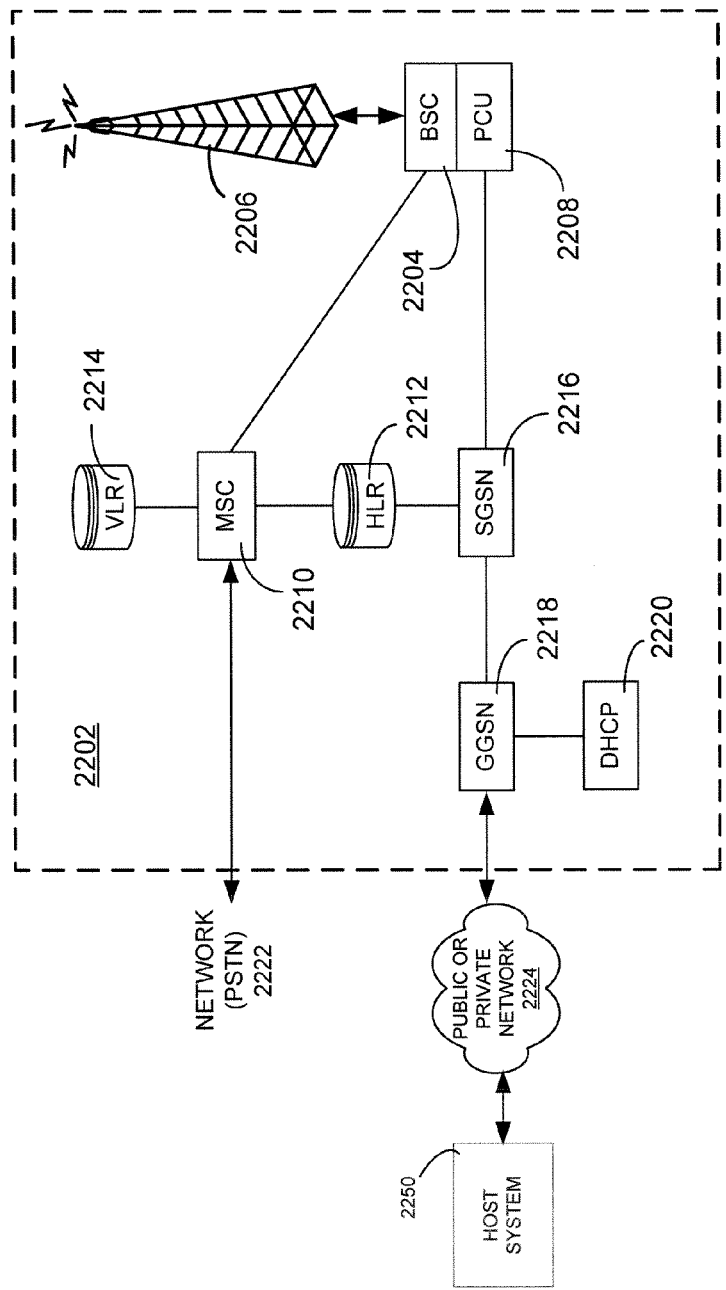
FIG. 8 is a block diagram of an exemplary node of a wireless network, which may serve as the network in the exemplary embodiments.

Referring now to FIG. 8, a block diagram of an exemplary implementation of a node 2202 of the wireless network 2200 is shown. In practice, the wireless network 2200 comprises one or more nodes 2202. In conjunction with the connect module 1144, the mobile device 1100 can communicate with the node 2202 within the wireless network 2200. In the exemplary implementation of FIG. 8, the node 2202 is configured in accordance with General Packet Radio Service (GPRS) and Global Systems for Mobile (GSM) technologies. The node 2202 includes a base station controller (BSC) 2204 with an associated tower station 2206, a Packet Control Unit (PCU) 2208 added for GPRS support in GSM, a Mobile Switching Center (MSC) 2210, a Home Location Register (HLR) 2212, a Visitor Location Registry (VLR) 2214, a Serving GPRS Support Node (SGSN) 2216, a Gateway GPRS Support Node (GGSN) 2218, and a Dynamic Host Configuration Protocol (DHCP) 2220. This list of components is not meant to be an exhaustive list of the components of every node 2202 within a GSM/GPRS network, but rather a list of components that are commonly used in communications through the network 2200.

In a GSM network, the MSC 2210 is coupled to the BSC 2204 and to a landline network, such as a Public Switched Telephone Network (PSTN) 2222 to satisfy circuit switched requirements. The connection through the PCU 2208, the SGSN 2216 and the GGSN 2218 to a public or private network (Internet) 2224 (also referred to herein generally as a shared network infrastructure) represents the data path for GPRS capable mobile devices. In a GSM network extended with GPRS capabilities, the BSC 2204 also contains the Packet Control Unit (PCU) 2208 that connects to the SGSN 2216 to control segmentation, radio channel allocation and to satisfy packet switched requirements. To track the location of the mobile device 1100 and availability for both circuit switched and packet switched management, the HLR 2212 is shared between the MSC 2210 and the SGSN 2216. Access to the VLR 2214 is controlled by the MSC 2210.

The station 2206 is a fixed transceiver station and together with the BSC 2204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 2206. The fixed transceiver equipment normally performs such functions as modulation and possibly encoding and/or encryption of signals to be transmitted to the mobile device 1100 in accordance with particular, usually predetermined, communication protocols and parameters, under control of its controller. The fixed transceiver equipment similarly demodulates and possibly decodes and decrypts, if necessary, any communication signals received from the mobile device 1100 within its cell. Communication protocols and parameters may vary between different nodes. For example, one node may employ a different modulation scheme and operate at different frequencies than other nodes.

For all mobile devices 1100 registered with a specific network, permanent configuration data such as a user profile is stored in the HLR 2212. The HLR 2212 also contains location information for each registered mobile device and can be queried to determine the current location of a mobile device. The MSC 2210 is responsible for a group of location areas and stores the data of the mobile devices currently in its area of responsibility in the VLR 2214. Further, the VLR 2214 also contains information on mobile devices that are visiting other networks. The information in the VLR 2214 includes part of the permanent mobile device data transmitted from the HLR 2212 to the VLR 2214 for faster access. By moving additional information from a remote HLR 2212 node to the VLR 2214, the amount of traffic between these nodes can be reduced so that voice and data services can be provided with faster response times and at the same time requiring less use of computing resources.

The SGSN 2216 and the GGSN 2218 are elements added for GPRS support; namely packet switched data support, within GSM. The SGSN 2216 and the MSC 2210 have similar responsibilities within the wireless network 2200 by keeping track of the location of each mobile device 1100. The SGSN 2216 also performs security functions and access control for data traffic on the wireless network 2200. The GGSN 2218 provides internetworking connections with external packet switched networks and connects to one or more SGSN's 2216 via an Internet Protocol (IP) backbone network operated within the network 2200. During normal operations, a given mobile device 1100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 2220 connected to the GGSN 2218. There are many mechanisms for dynamic IP assignment, including using a combination of a Remote Authentication Dial-In User Service (RADIUS) server and a DHCP server. Once the GPRS Attach is complete, a logical connection is established from a mobile device 1100, through the PCU 2208, and the SGSN 2216 to an Access Point Node (APN) within the GGSN 2218. The APN represents a logical end of an IP tunnel that can either access direct Internet compatible services or private network connections. The APN also represents a security mechanism for the network 2200, insofar as each mobile device 1100 must be assigned to one or more APNs and mobile devices 1100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 2200. To maximize use of the PDP Contexts, the network 2200 will run an idle timer for each PDP Context to determine if there is a lack of activity. When a mobile device 1100 is not using its PDP Context, the PDP Context can be de-allocated and the IP address returned to the IP address pool managed by the DHCP server 2220.

Figure 9:
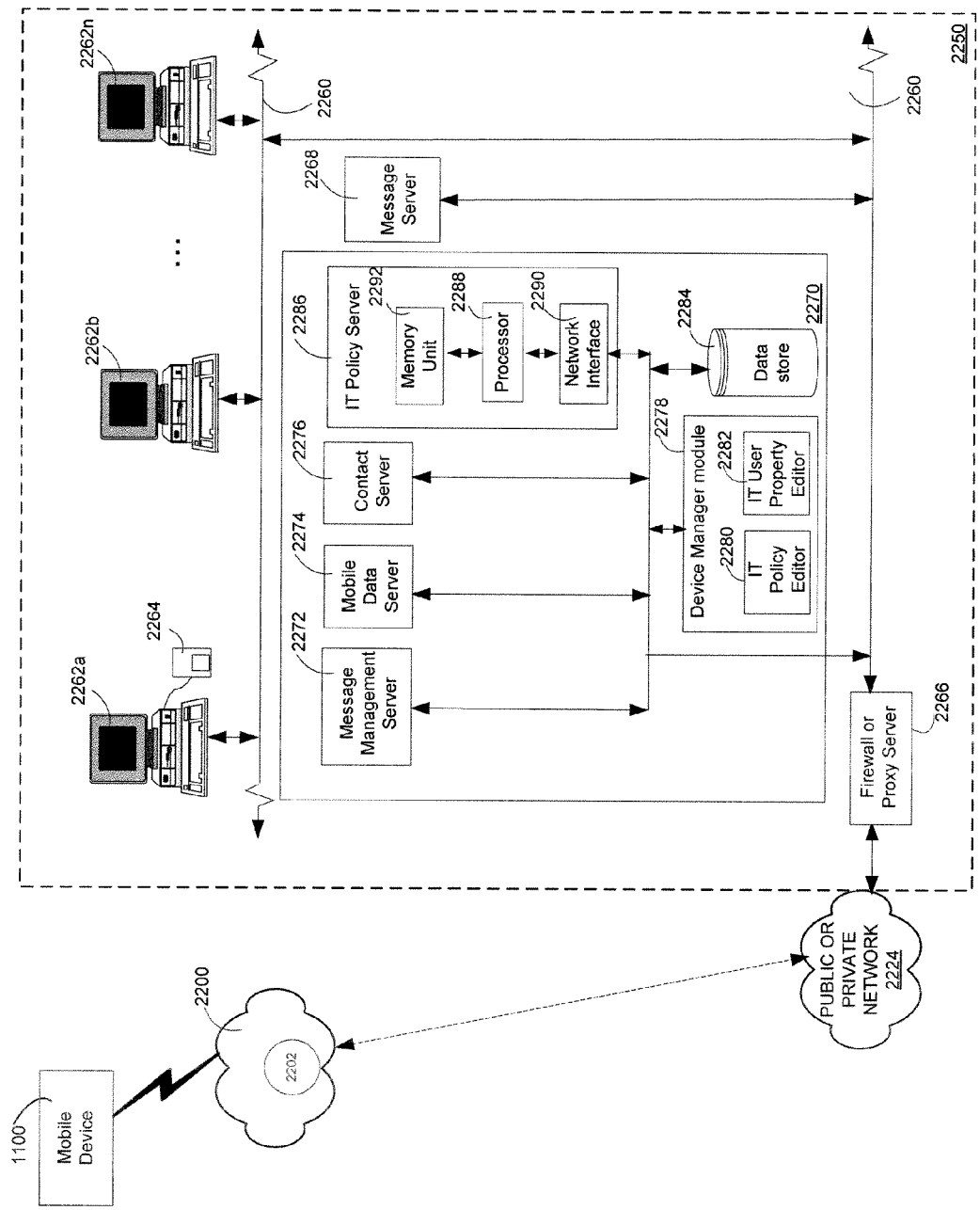
FIG. 9 is a block diagram illustrating components of an exemplary host system for use with the wireless network of FIG. 8.

Referring now to FIG. 9, shown therein is a block diagram illustrating components of an exemplary configuration of a host system 2250 that the mobile device 1100 can communicate with in conjunction with the connect module 1144. The host system 2250 will typically be a corporate enterprise or other local area network (LAN), but may also be a home office computer or some other private system, for example, in variant implementations. In this example shown in FIG. 9, the host system 2250 is depicted as a LAN of an organization to which a user of the mobile device 1100 belongs. Typically, a plurality of mobile devices can communicate wirelessly with the host system 2250 through one or more nodes 2202 of the wireless network 2200.

The host system 2250 comprises a number of network components connected to each other by a network 2260. For instance, a user's desktop computer 2262a with an accompanying cradle 2264 for the user's mobile device 1100 is situated on a LAN connection. The cradle 2264 for the mobile device 1100 can be coupled to the computer 2262a by a serial or a Universal Serial Bus (USB) connection, for example. Other user computers 2262b-2262n are also situated on the network 2260, and each may or may not be equipped with an accompanying cradle 2264. The cradle 2264 facilitates the loading of information (e.g. PIM data, private symmetric encryption keys to facilitate secure communications) from the user computer 2262a to the mobile device 1100, and may be particularly useful for bulk information updates often performed in initializing the mobile device 1100 for use. The information downloaded to the mobile device 1100 may include certificates used in the exchange of messages.

It will be understood by persons skilled in the art that the user computers 2262a-2262n will typically also be connected to other peripheral devices, such as printers, etc. which are not explicitly shown in FIG. 9. Furthermore, only a subset of network components of the host system 2250 are shown in FIG. 9 for ease of exposition, and it will be understood by persons skilled in the art that the host system 2250 will comprise additional components that are not explicitly shown in FIG. 9 for this exemplary configuration. More generally, the host system 2250 may represent a smaller part of a larger network (not shown) of the organization, and may comprise different components and/or be arranged in different topologies than that shown in the exemplary embodiment of FIG. 9.

To facilitate the operation of the mobile device 1100 and the wireless communication of messages and message-related data between the mobile device 1100 and components of the host system 2250, a number of wireless communication support components 2270 can be provided. In some implementations, the wireless communication support components 2270 can include a message management server 2272, a mobile data server 2274, a contact server 2276, and a device manager module 2278. The device manager module 2278 includes an IT Policy editor 2280 and an IT user property editor 2282, as well as other software components for allowing an IT administrator to configure the mobile devices 1100. In an alternative embodiment, there may be one editor that provides the functionality of both the IT policy editor 2280 and the IT user property editor 2282. The support components 2270 also include a data store 2284, and an IT policy server 2286. The IT policy server 2286 includes a processor 2288, a network interface 2290 and a memory unit 2292. The processor 2288 controls the operation of the IT policy server 2286 and executes functions related to the standardized IT policy as described below. The network interface 2290 allows the IT policy server 2286 to communicate with the various components of the host system 2250 and the mobile devices 1100. The memory unit 2292 can store functions used in implementing the IT policy as well as related data. Those skilled in the art know how to implement these various components. Other components may also be included as is well known to those skilled in the art. Further, in some implementations, the data store 2284 can be part of any one of the servers.

In this exemplary embodiment, the mobile device 1100 communicates with the host system 2250 through node 2202 of the wireless network 2200 and a shared network infrastructure 2224 such as a service provider network or the public Internet. Access to the host system 2250 may be provided through one or more routers (not shown), and computing devices of the host system 2250 may operate from behind a firewall or proxy server 2266. The proxy server 2266 provides a secure node and a wireless internet gateway for the host system 2250. The proxy server 2266 intelligently routes data to the correct destination server within the host system 2250.

In some implementations, the host system 2250 can include a wireless VPN router (not shown) to facilitate data exchange between the host system 2250 and the mobile device 1100. The wireless VPN router allows a VPN connection to be established directly through a specific wireless network to the mobile device 1100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 1100 in this alternative implementation.

Messages intended for a user of the mobile device 1100 are initially received by a message server 2268 of the host system 2250. Such messages may originate from any number of sources. For instance, a message may have been sent by a sender from the computer 2262b within the host system 2250, from a different mobile device (not shown) connected to the wireless network 2200 or a different wireless network, or from a different computing device, or other device capable of sending messages, via the shared network infrastructure 2224, possibly through an application service provider (ASP) or Internet service provider (ISP), for example.

The message server 2268 typically acts as the primary interface for the exchange of messages, particularly e-mail messages, within the organization and over the shared network infrastructure 2224. Each user in the organization that has been set up to send and receive messages is typically associated with a user account managed by the message server 2268. Some exemplary implementations of the message server 2268 include a Microsoft Exchange™ server, a Lotus Domino™ server, a Novell Groupwise™ server, or another suitable mail server installed in a corporate environment. In some implementations, the host system 2250 may comprise multiple message servers 2268. The message server 2268 may also be adapted to provide additional functions beyond message management, including the management of data associated with calendars and task lists, for example.

When messages are received by the message server 2268, they are typically stored in a data store associated with the message server 2268. In at least some embodiments, the data store may be a separate hardware unit, such as data store 2284, that the message server 2268 communicates with. Messages can be subsequently retrieved and delivered to users by accessing the message server 2268. For instance, an e-mail client application operating on a user's computer 2262a may request the e-mail messages associated with that user's account stored on the data store associated with the message server 2268. These messages are then retrieved from the data store and stored locally on the computer 2262a. The data store associated with the message server 2268 can store copies of each message that is locally stored on the mobile device 1100. Alternatively, the data store associated with the message server 2268 can store all of the messages for the user of the mobile device 1100 and only a smaller number of messages can be stored on the mobile device 1100 to conserve memory. For instance, the most recent messages (i.e. those received in the past two to three months for example) can be stored on the mobile device 1100.

When operating the mobile device 1100, the user may wish to have e-mail messages retrieved for delivery to the mobile device 1100. The message application 1138 operating on the mobile device 1100 may also request messages associated with the user's account from the message server 2268. The message application 1138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 1100 is assigned its own e-mail address, and messages addressed specifically to the mobile device 1100 are automatically redirected to the mobile device 1100 as they are received by the message server 2268.

The message management server 2272 can be used to specifically provide support for the management of messages, such as e-mail messages, that are to be handled by mobile devices. Generally, while messages are still stored on the message server 2268, the message management server 2272 can be used to control when, if, and how messages are sent to the mobile device 1100. The message management server 2272 also facilitates the handling of messages composed on the mobile device 1100, which are sent to the message server 2268 for subsequent delivery.

For example, the message management server 2272 may monitor the user's "mailbox" (e.g. the message store associated with the user's account on the message server 2268) for new e-mail messages, and apply user-definable filters to new messages to determine if and how the messages are relayed to the user's mobile device 1100. The message management server 2272 may also compress and encrypt new messages (e.g. using an encryption technique such as Data Encryption Standard (DES), Triple DES, or Advanced Encryption Standard (AES)) and push them to the mobile device 1100 via the shared network infrastructure 2224 and the wireless network 2200. The message management server 2272 may also receive messages composed on the mobile device 1100 (e.g. encrypted using Triple DES), decrypt and decompress the composed messages, re-format the composed messages if desired so that they will appear to have originated from the user's computer 2262a, and re-route the composed messages to the message server 2268 for delivery.

Certain properties or restrictions associated with messages that are to be sent from and/or received by the mobile device 1100 can be defined (e.g. by an administrator in accordance with IT policy) and enforced by the message management server 2272. These may include whether the mobile device 1100 may receive encrypted and/or signed messages, minimum encryption key sizes, whether outgoing messages must be encrypted and/or signed, and whether copies of all secure messages sent from the mobile device 1100 are to be sent to a pre-defined copy address, for example.

The message management server 2272 may also be adapted to provide other control functions, such as only pushing certain message information or pre-defined portions (e.g. "blocks") of a message stored on the message server 2268 to the mobile device 1100. For example, in some cases, when a message is initially retrieved by the mobile device 1100 from the message server 2268, the message management server 2272 may push only the first part of a message to the mobile device 1100, with the part being of a pre-defined size (e.g. 2 KB). The user can then request that more of the message be delivered in similar-sized blocks by the message management server 2272 to the mobile device 1100, possibly up to a maximum pre-defined message size. Accordingly, the message management server 2272 facilitates better control over the type of data and the amount of data that is communicated to the mobile device 1100, and can help to minimize potential waste of bandwidth or other resources.

The mobile data server 2274 encompasses any other server that stores information that is relevant to the corporation. The mobile data server 2274 may include, but is not limited to, databases, online data document repositories, customer relationship management (CRM) systems, or enterprise resource planning (ERP) applications.

The contact server 2276 can provide information for a list of contacts for the user in a similar fashion as the address book on the mobile device 1100. Accordingly, for a given contact, the contact server 2276 can include the name, phone number, work address and e-mail address of the contact, among other information. The contact server 2276 can also provide a global address list that contains the contact information for all of the contacts associated with the host system 2250.

It will be understood by persons skilled in the art that the message management server 2272, the mobile data server 2274, the contact server 2276, the device manager module 2278, the data store 2284 and the IT policy server 2286 do not need to be implemented on separate physical servers within the host system 2250. For example, some or all of the functions associated with the message management server 2272 may be integrated with the message server 2268, or some other server in the host system 2250. Alternatively, the host system 2250 may comprise multiple message management servers 2272, particularly in variant implementations where a large number of mobile devices need to be supported.

Alternatively, in some embodiments, the IT policy server 2286 can provide the IT policy editor 2280, the IT user property editor 2282 and the data store 2284. In some cases, the IT policy server 2286 can also provide the device manager module 2278. The processor 2288 of the IT policy server 2286 can be used to perform the various steps of a method for providing IT policy data that is customizable on a per-user basis. The processor 2288 can execute the editors 2280 and 2282. In some cases, the functionality of the editors 2280 and 2282 can be provided by a single editor. In some cases, the memory unit 2292 can provide the data store 2284.

The device manager module 2278 provides an IT administrator with a graphical user interface with which the IT administrator interacts to configure various settings for the mobile devices 1100. As mentioned, the IT administrator can use IT policy rules to define behaviors of certain applications on the mobile device 1100 that are permitted such as phone, web browser or Instant Messenger use. The IT policy rules can also be used to set specific values for configuration settings that an organization requires on the mobile devices 1100 such as auto signature text, WLAN/VoIP/VPN configuration, security requirements (e.g. encryption algorithms, password rules, etc.), specifying themes or applications that are allowed to run on the mobile device 1100, and the like.

What has been described is merely illustrative of the application of the principles of the embodiments. Other arrangements and methods can be implemented by those skilled in the art without departing from the spirit and scope of the embodiments described herein.

We claim:

1. A method for sending multimedia content in a client and server system in a network, wherein the multimedia content comprises a plurality of separate and distinct images, the method comprising:
   concurrently, for each image of the plurality of separate and distinct images, sending a first predetermined portion only of that image from the server system through the network, the first predetermined portion of that image comprising a reconstruction of the entirety of that image at a first quality level; and
   after sending the first predetermined portion of each image of the plurality of separate and distinct images, for each image of the plurality of separate and distinct images, successively sending at least one subsequent predetermined portion of that image, the at least one subsequent predetermined portion of that image comprising image refinement data for concurrently reconstructing the entirety of that image at a successive higher quality level;
   wherein sending the first predetermined portion is handled using a Hyper-Text Transfer Protocol connection and sending the subsequent predetermined portions is handled using another predetermined protocol connection after the Hyper-Text Transfer Protocol connection has closed.

2. A method according to claim 1, further comprising:
   receiving information related to the sending of the plurality of separate and distinct images; and
   wherein the sending of the first predetermined portions and subsequent predetermined portions of the plurality of separate and distinct images is based on the received information.

3. A method according to claim 2, wherein the information related to the sending of the plurality of separate and distinct images comprises information selected from the group consisting of: information related to the plurality of separate and distinct images for which sending is to be delayed and information related to the ordering in which the plurality of separate and distinct images are to be sent.

4. A method according to claim 1, further comprising:
   prior to sending, determining if any of the plurality of separate and distinct images is appropriate for division into predetermined portions; and
   dividing each appropriate image of the plurality of separate and distinct images into predetermined portions prior to sending.

5. A method according to claim 4, further comprising compressing at least one of the plurality of separate and distinct images that is not appropriate for division prior to sending.

6. A method according to claim 1, wherein the network is a wireless network and the server system is a web server or a server side proxy.

7. A method according to claim 1, wherein the plurality of separate and distinct images is a plurality of separate and distinct still images.

8. A method according to claim 1, wherein for each image of the plurality of separate and distinct images, the at least one subsequent predetermined portion of that image is a plurality of subsequent predetermined portions of that image, and the method further comprises, for each image of the plurality of separate and distinct images, successively sending subsequent predetermined portions of that image, wherein the subsequent predetermined portions of that image comprise image refinement data for concurrently reconstructing the entirety of that image at successive higher quality levels.

9. A method according to claim 8, wherein for each image of the plurality of separate and distinct images, successively sending subsequent predetermined portions of that image comprises, after sending the first predetermined portion of that image, concurrently sending subsequent predetermined portions of that image.

10. A method according to claim 1, wherein for each image of the plurality of separate and distinct images, successively sending subsequent predetermined portions of that image occurs automatically after sending the first predetermined portions of that image.

11. A system for delivering multimedia content through a network, wherein the multimedia content comprises a plurality of separate and distinct images, the system comprising:

a server side computing device comprising a server side processor configured to:

concurrently, for each image of the plurality of separate and distinct images, send a first predetermined portion only of that image through the network, the first predetermined portion of that image comprising a reconstruction of the entirety of that image at a first quality level; and after sending the first predetermined portion of each image of the plurality of separate and distinct images, for each image of the plurality of separate and distinct images, successively send at least one subsequent predetermined portion of that image, the at least one subsequent predetermined portion of that image comprising image refinement data for concurrently reconstructing the entirety of that image at a successive higher quality level;

wherein sending the first predetermined portion is handled using a Hyper-Text Transfer Protocol connection and sending the subsequent predetermined portions is handled using another predetermined protocol connection after the Hyper-Text Transfer Protocol connection has closed; and a client side computing device comprising a client side processor configured to:

for each image of the plurality of separate and distinct images, receive the first predetermined portion only of that image, the first predetermined portion of that image comprising a reconstruction of the entirety of that image at a first quality level; and after receiving the first predetermined portion of each image of the plurality of separate and distinct images, for each image of the plurality of separate and distinct images, successively receive at least one subsequent predetermined portion of that image, the at least one subsequent predetermined portion of that image comprising image refinement data for concurrently reconstructing the entirety of that image at a successive higher quality level;

wherein receiving the first predetermined portion is handled using the Hyper-Text Transfer Protocol connection and receiving the at least one subsequent predetermined portion is handled using the other predetermined protocol connection after the Hyper-Text Transfer Protocol connection has closed.

12. A system according to claim 11, wherein the client side processor is further configured to, before receiving at least one of the first predetermined portion and the at least one subsequent predetermined portion, send a request for multimedia content, where the request comprises information related to the sending of the plurality of separate and distinct images, and the server side processor is further configured to receive the request and send the multimedia content in accordance with the request.

13. A system according to claim 12, wherein the information related to the sending of the plurality of separate and distinct images comprises information related to the plurality of separate and distinct images for which sending is to be delayed.

14. A system according to claim 12, wherein the information related to the sending of the plurality of separate and distinct images comprises information related to the ordering in which the plurality of separate and distinct images are to be sent.

15. A system according to claim 11, wherein the server side processor is further configured to:

prior to sending, determine if any of the plurality of separate and distinct images is appropriate for division into predetermined portions; and divide each appropriate image of the plurality of separate and distinct images into predetermined portions prior to sending.

16. A system according to claim 15, wherein the server side processor is further configured to compress at least one of the plurality of separate and distinct images that is not appropriate for division prior to sending.

17. A system according to claim 11, wherein the network is a wireless network.

18. A system according to claim 11, wherein the server side computing device comprises a web server or a server side proxy.

19. A system according to claim 11, wherein the client side computing device comprises a mobile device or a client side proxy.

20. A system according to claim 11, wherein the plurality of separate and distinct images is a plurality of separate and distinct still images.

21. A system according to claim 11, wherein for each image of the plurality of separate and distinct images, the at least one subsequent predetermined portion of that image is a plurality of subsequent predetermined portions of that image, and the server side processor is further configured to:

for each image of the plurality of separate and distinct images, successively send subsequent predetermined portions of that image, wherein the subsequent predetermined portions of that image comprise image refinement data for concurrently reconstructing the entirety of that image at successive higher quality levels; and the client side processor is further configured to:

for each image of the plurality of separate and distinct images, successively receive subsequent predetermined portions of that image, wherein the subsequent predetermined portions of that image comprise image refinement data for concurrently reconstructing the entirety of that image at successive higher quality levels.

22. A system according to claim 21, wherein for each image of the plurality of separate and distinct images, the client side processor is configured to
after receiving the first predetermined portion of that image, concurrently reconstruct the entirety of that image from the subsequent predetermined portions of that image to a next higher quality level in the successive higher quality levels; and
step-wise progressively further concurrently reconstruct the entirety of that image to a successive higher quality level in the successive higher quality levels.

23. A physical computer-readable storage medium for sending multimedia content in a client and server system in a network, wherein the multimedia content comprises a plurality of separate and distinct images, the computer-readable medium storing instructions which, when executed by a computing device, cause the computing device to:
concurrently, for each image of the plurality of separate and distinct images, send only a first predetermined portion of that image from the server through the network, the first predetermined portion of that image comprising a reconstruction of the entirety of that image at a first quality level; and
after sending the first predetermined portion of each image of the plurality of separate and distinct images, for each image of the plurality of separate and distinct images, successively send at least one subsequent predetermined portion of that image, the at least one subsequent predetermined portion of that image comprising image refinement data for concurrently reconstructing the entirety of that image at a successive higher quality level;
wherein sending the first predetermined portion is handled using a Hyper-Text Transfer Protocol connection and sending the at least one subsequent predetermined portions is handled using another predetermined protocol connection after the Hyper-Text Transfer Protocol connection has closed.

24. A physical computer-readable storage medium according to claim 23, wherein for each image of the plurality of separate and distinct images, the at least one subsequent predetermined portion of that image is a plurality of subsequent predetermined portions of that image, and the physical computer-readable medium stored instructions, when executed by a computing device, further causes the computing device to, for each image of the plurality of separate and distinct images, successively send subsequent predetermined portions of that image, wherein the subsequent predetermined portions of that image comprise image refinement data for concurrently reconstructing the entirety of that image at successive higher quality levels.

25. A physical computer-readable storage medium according to claim 24, wherein for each image of the plurality of separate and distinct images, successively sending subsequent predetermined portions of that image comprises, after sending the first predetermined portion of that image, concurrently sending the subsequent predetermined portions of that image.

26. A method for receiving multimedia content in a client and server system in a network, wherein the multimedia content comprises a plurality of separate and distinct images, the method comprising:
for each image of the plurality of separate and distinct images, receiving a predetermined portion only of that image through the network at the client, the first predetermined portion of that image comprising a reconstruction of the entirety of that image at a first quality level; and
after receiving the first predetermined portion of each image of the plurality of separate and distinct images, for each image of the plurality of separate and distinct images, successively receiving at least one subsequent predetermined portion of that image, the at least one subsequent predetermined portion of that image comprising image refinement data for concurrently reconstructing the entirety of that image at a successive higher quality level;
wherein receiving the first predetermined portion is handled using a Hyper-Text Transfer Protocol connection and receiving the at least one subsequent predetermined portions is handled using another predetermined protocol connection after the Hyper-Text Transfer Protocol connection has closed.

27. A method according to claim 26, further comprising:
before receiving at least one of the first predetermined portion and the at least one subsequent predetermined portion, sending a request for multimedia content, where the request comprises information related to the sending of the plurality of separate and distinct images.

28. A method according to claim 27, wherein the information related to the sending of the plurality of separate and distinct images comprises information selected from the group consisting of information related to the plurality of separate and distinct images for which sending is to be delayed and information related to the ordering in which the plurality of separate and distinct images are to be sent.

29. A method according to claim 26, wherein the network is a wireless network and the client system is a mobile device or a client side proxy.

30. A method according to claim 26, further comprising:
prior to receiving, determining if the multimedia content is available in a cache; and
where, for each image of the plurality of separate and distinct images, the first predetermined portion of that image is available in the cache but the at least one subsequent predetermined portion of that image is not available in the cache, sending a request for the at least one subsequent predetermined portion of that image without requesting the first predetermined portion of that image.

31. A method according to claim 26, wherein the plurality of separate and distinct images is a plurality of separate and distinct still images.

32. A method according to claim 26, wherein for each image of the plurality of separate and distinct images, the at least one subsequent predetermined portion of that image is a plurality of subsequent predetermined portions of that image, and the method further comprises, for each image of the plurality of separate and distinct images, successively receiving subsequent predetermined portions of that image, wherein the subsequent predetermined portions of that image comprise image refinement data for concurrently reconstructing the entirety of that image at successive higher quality levels.

33. A method according to claim 32, wherein for each image of the plurality of separate and distinct images, successively receiving subsequent predetermined portions of that image comprises,
after receiving the first predetermined portion of that image, concurrently reconstructing the entirety of that image from the subsequent predetermined portions of that image to a next higher quality level in the successive higher quality levels; and step-wise progressively further concurrently reconstructing the entirety of that image to a successive higher quality level in the successive higher quality levels.

34. A physical computer-readable storage medium for receiving multimedia content in a client and server system in a network, wherein the multimedia content comprises a plurality of separate and distinct images, the computer-readable medium storing instructions which, when executed by a computing device, cause the computing device to:

for each image of the plurality of separate and distinct images, receive only a first predetermined portion of that image through the network at the client, the first predetermined portion of that image comprising a reconstruction of the entirety of that image at a first quality level; and after receiving the first predetermined portion of each image of the plurality of separate and distinct images, for each image of the plurality of separate and distinct images, successively receive at least one subsequent predetermined portion of that image, the at least one subsequent predetermined portion of that image comprising image refinement data for concurrently reconstructing the entirety of that image at a successive higher quality level;

wherein receiving the first predetermined portion is handled using a Hyper-Text Transfer Protocol connection and receiving the at least one subsequent predetermined portions is handled using another predetermined protocol connection after the Hyper-Text Transfer Protocol connection has closed.

35. A physical computer-readable storage medium according to claim 34, wherein for each image of the plurality of separate and distinct images, the at least one subsequent predetermined portion of that image is a plurality of subsequent predetermined portions of that image, and the physical computer-readable medium stored instructions, when executed by a computing device, further causes the computing device to for each image of the plurality of separate and distinct images, successively receive subsequent predetermined portions of that image, wherein the subsequent predetermined portions of that image comprise image refinement data for concurrently reconstructing the entirety of that image at successive higher quality levels.

36. A physical computer-readable storage medium according to claim 35, wherein for each image of the plurality of separate and distinct images, successively receiving subsequent predetermined portions of that image comprises, after receiving the first predetermined portion of that image, concurrently reconstructing the entirety of that image from the subsequent predetermined portions of that image to a next higher quality level in the successive higher quality levels; and step-wise progressively further concurrently reconstructing the entirety of that image to a successive higher quality level in the successive higher quality levels.

\* \* \* \* \*